US010051317B2

(12) United States Patent
Aruga et al.

(10) Patent No.: US 10,051,317 B2
(45) Date of Patent: Aug. 14, 2018

(54) VIDEO TRANSMISSION AND DISPLAY SYSTEM

(71) Applicant: SEIKO EPSON CORPORATION, Tokyo (JP)

(72) Inventors: Naoto Aruga, Okaya (JP); Shinichi Kobayashi, Azumino (JP); Keiichi Okano, Matsumoto (JP); Kenro Yajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/033,161

(22) PCT Filed: Dec. 11, 2014

(86) PCT No.: PCT/JP2014/006176
§ 371 (c)(1),
(2) Date: Apr. 29, 2016

(87) PCT Pub. No.: WO2015/098016
PCT Pub. Date: Jul. 2, 2015

(65) Prior Publication Data
US 2016/0261905 A1    Sep. 8, 2016

(30) Foreign Application Priority Data

Dec. 26, 2013 (JP) ................................ 2013-268217
Sep. 10, 2014 (JP) ................................ 2014-184367

(51) Int. Cl.
*H04N 21/41* (2011.01)
*H04N 21/436* (2011.01)
(Continued)

(52) U.S. Cl.
CPC ......... *H04N 21/436* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS

2002/0085075 A1    7/2002    Shinada et al.
2011/0116458 A1    5/2011    Hsu et al.
(Continued)

FOREIGN PATENT DOCUMENTS

JP    2007 293721 A  *  8/2007
JP    2007-293721 A    11/2007
(Continued)

OTHER PUBLICATIONS

Wi-Fi Certified Miracast, Wi-Fi Alliance, Sep. 19, 2012, pp. 2-18.*
(Continued)

*Primary Examiner* — Cai Chen
(74) *Attorney, Agent, or Firm* — Oliff PLC

(57) ABSTRACT

A video display system that transmits a video from a video transmission device equipped with neither a display unit nor an operation unit for realizing a user interface to a video reception and display device according to a video radio transmission standard for transmitting a video through one-to-one direct radio communication and performs display. The video transmission device includes a connection control unit configured to control establishment of first connection for connecting the video transmission device and the video reception and display device according to the video radio transmission standard and second connection for connecting the video transmission device and the video reception and display device peer-to-peer prior to the establishment of the first connection. The connection control unit starts processing of the second connection according to any one of a
(Continued)

request from the video reception and display device and occurrence of an opportunity in the video transmission device.

16 Claims, 13 Drawing Sheets

(51) Int. Cl.
H04L 12/24 (2006.01)
G02B 27/01 (2006.01)
G06K 7/10 (2006.01)
G06K 7/14 (2006.01)

(52) U.S. Cl.
CPC ....... G06K 7/10366 (2013.01); G06K 7/1417 (2013.01); H04L 41/0806 (2013.01); H04N 21/4126 (2013.01)

(56) References Cited

U.S. PATENT DOCUMENTS

| 2012/0210268 | A1* | 8/2012 | Hilbrink | G06F 3/0484 715/773 |
| 2013/0002701 | A1 | 1/2013 | Ida | |
| 2015/0071147 | A1* | 3/2015 | Yamaura | H04M 1/7253 370/311 |
| 2015/0085847 | A1 | 3/2015 | Yamaura | |
| 2015/0094072 | A1 | 4/2015 | Yamaura | |
| 2017/0078969 | A1 | 3/2017 | Yamaura | |

FOREIGN PATENT DOCUMENTS

| JP | 2012-044429 A | 3/2012 |
| JP | 2013-511235 A | 3/2013 |
| WO | 2013/153888 A1 | 10/2013 |

OTHER PUBLICATIONS

WiFi Alliance: "Wi-Fi Certified MiracastTM: Extending the Wi-Fi experience to seamless video display;" Sep. 19, 2012; pp. 1-18; XP002700078; http://www.wi-fi.org/sites/default/files/uploads/wp_Miracast_Industry_20120919.pdff.

Wi-Fi Alliance: "Wi-Fi Peer-to-peer (P2P) Specification v1.2;" Dec. 14, 2011; pp. 1-159; XP008165048; http://www.wi-fi.org/knowledge-center/published-specifications.

Mar. 12, 2015 Search Report issued in International Patent Application No. PCT/JP2014/006176.

Mar. 12, 2015 Written Opinion issued in International Patent Application No. PCT/JP2014/006176.

Wi-Fi Alliance, Wi-Fi Alliance Technical Committee, Wi-Fi Display Technical Task Group, "Wi-Fi Display Technical Specification, Version 1.0.0", relevant pp. 28-82. Aug. 24, 2012.

* cited by examiner

[Fig. 1]
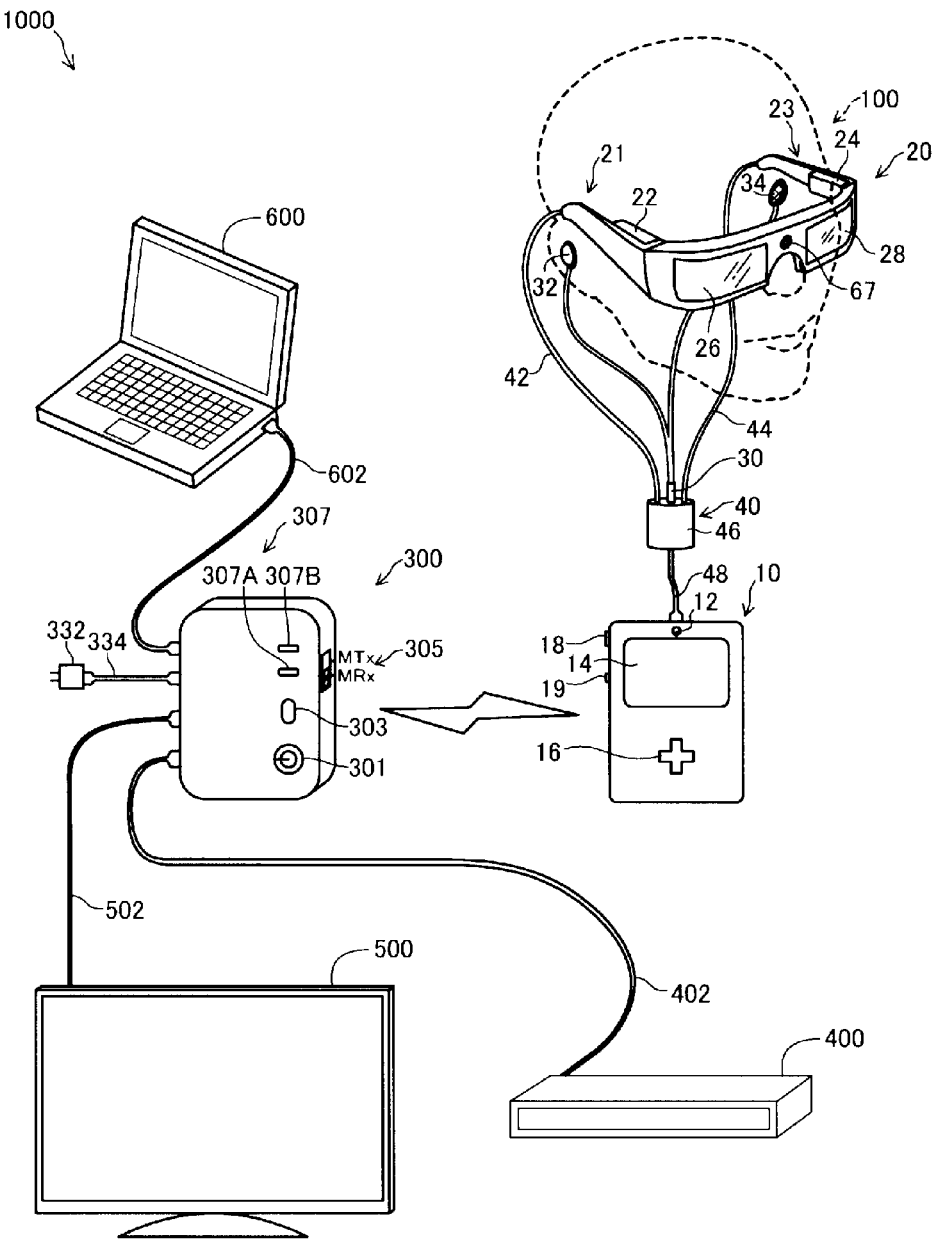

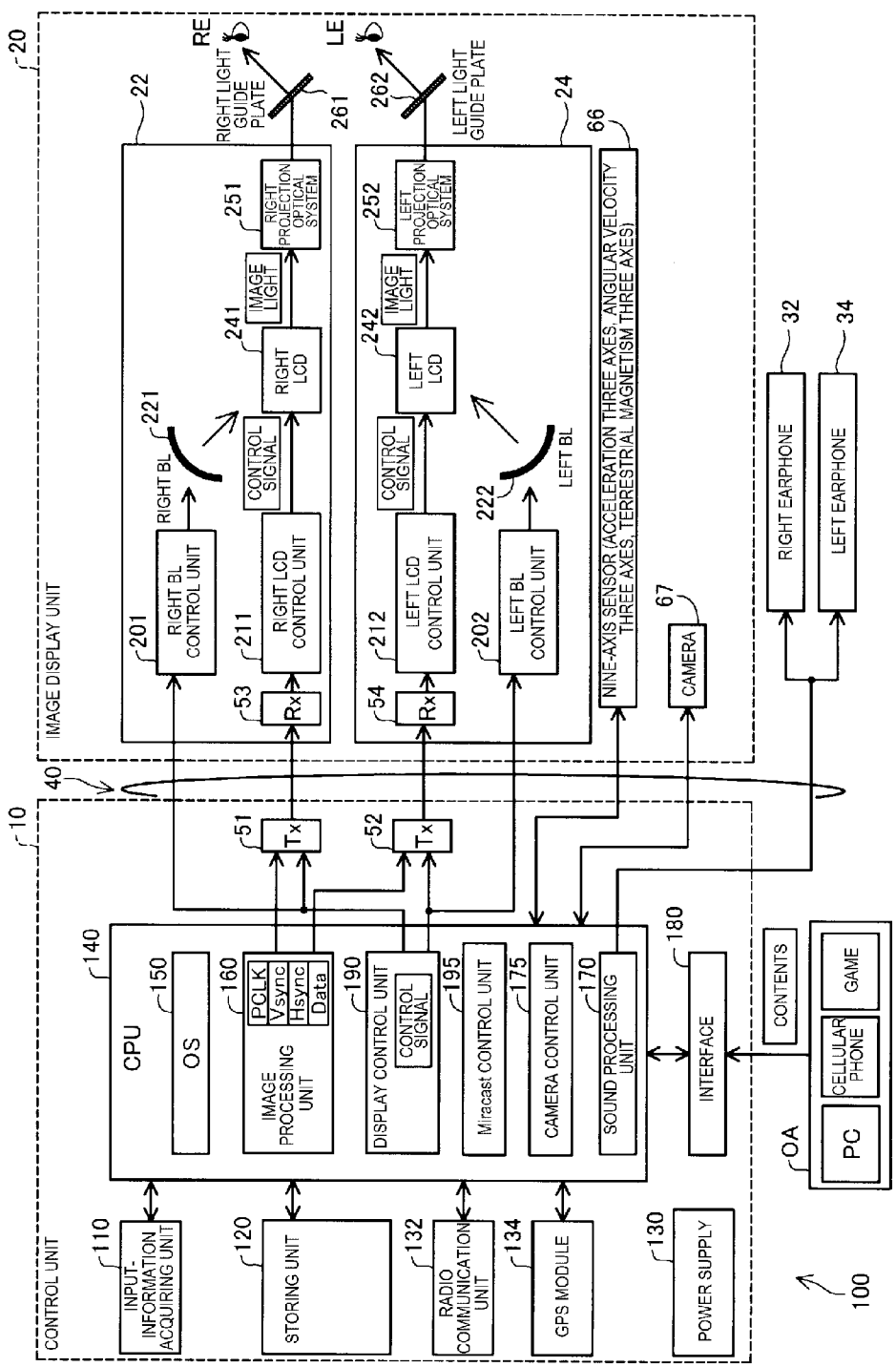
[Fig. 2]

[Fig. 3]
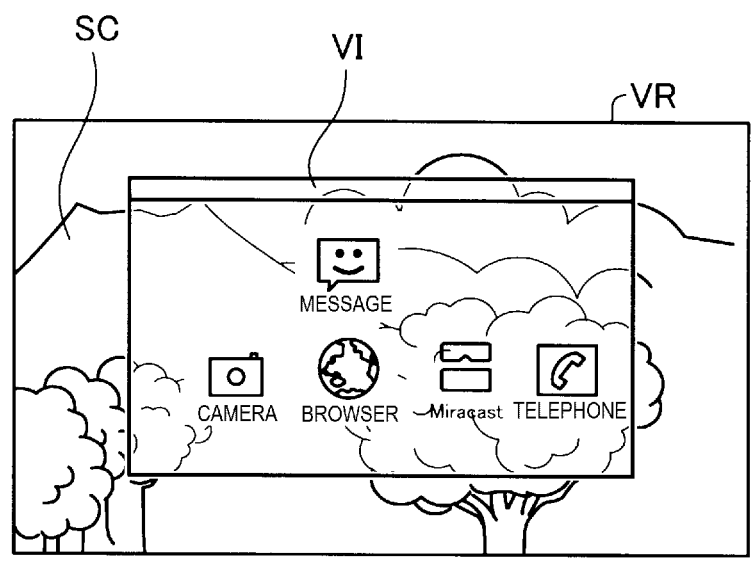

[Fig. 4]
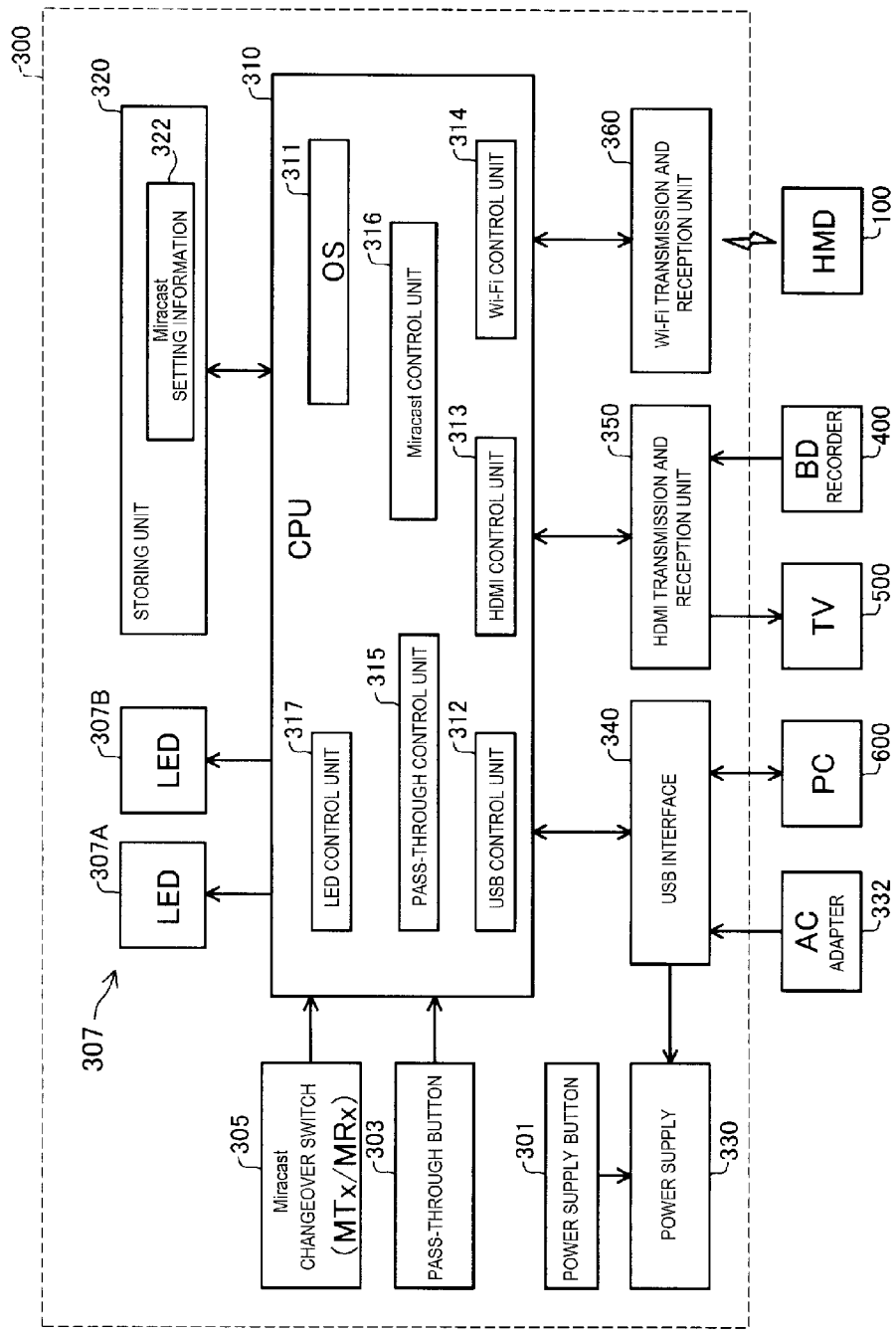

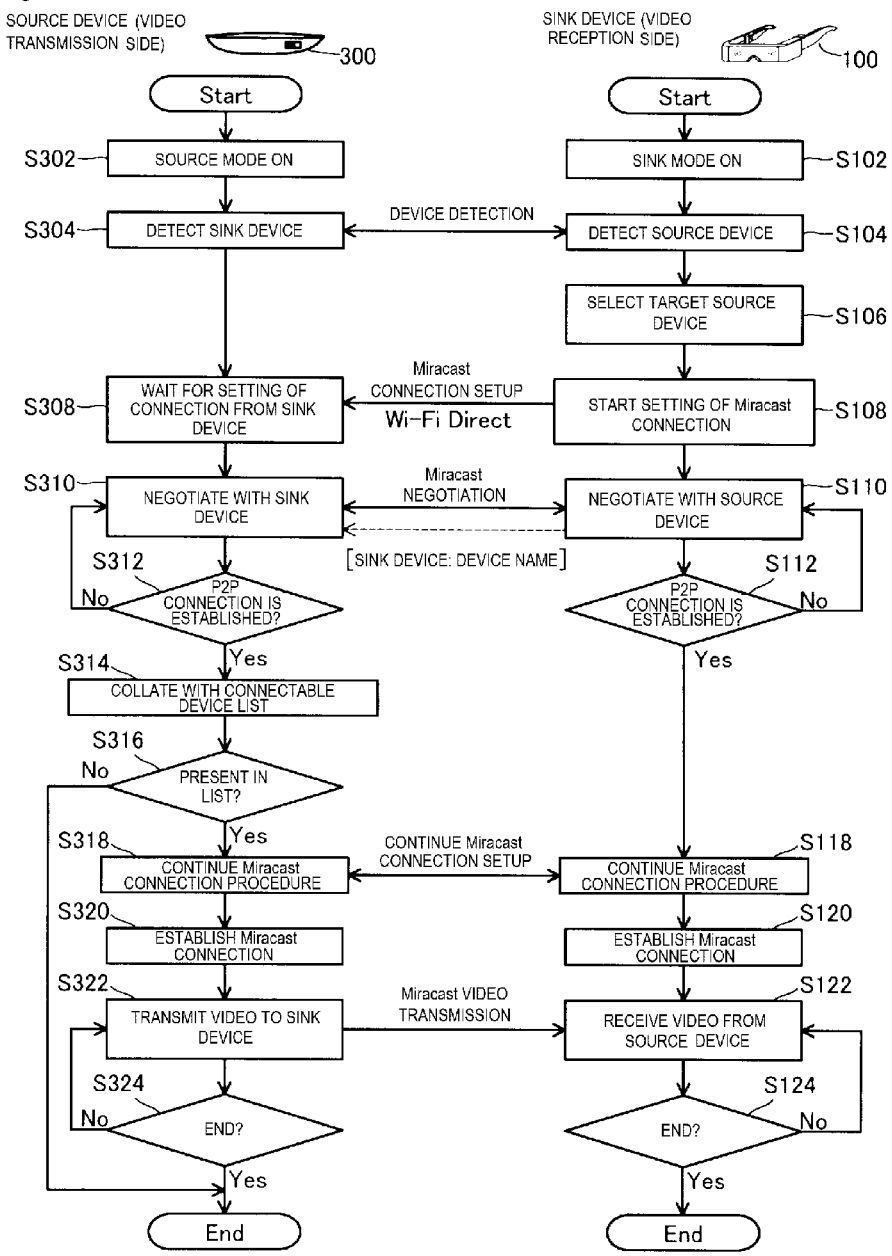

[Fig. 6]
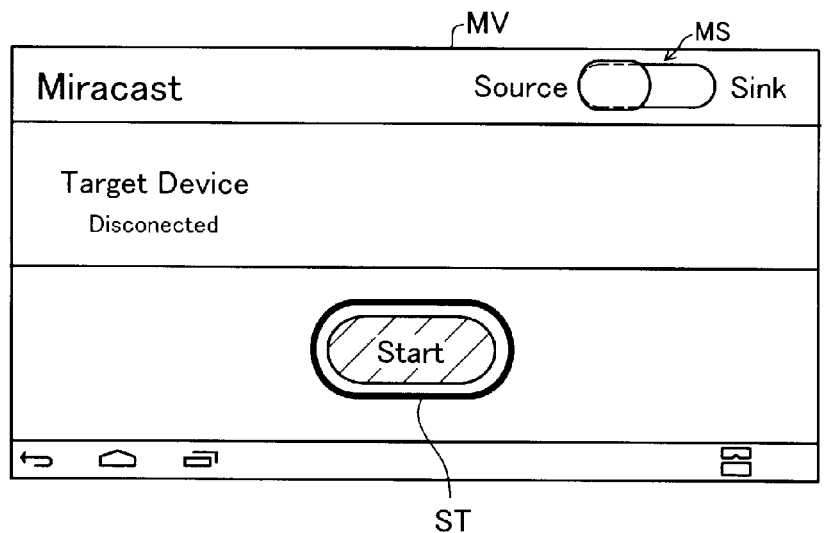
[Fig. 7]
(A)
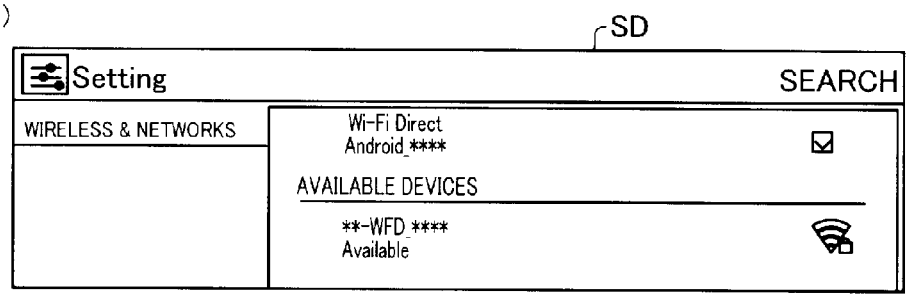
(B)
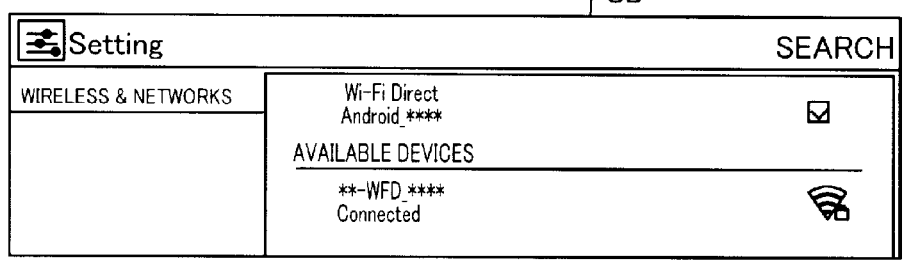

[Fig. 8]
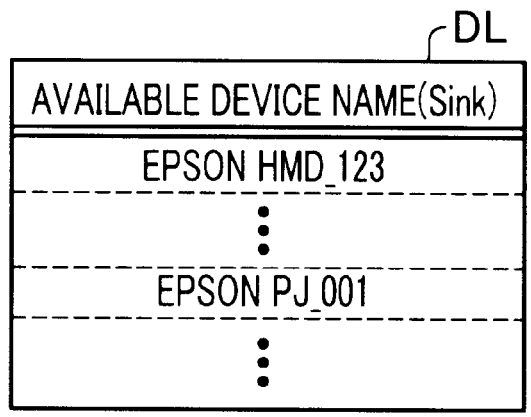
[Fig. 9]
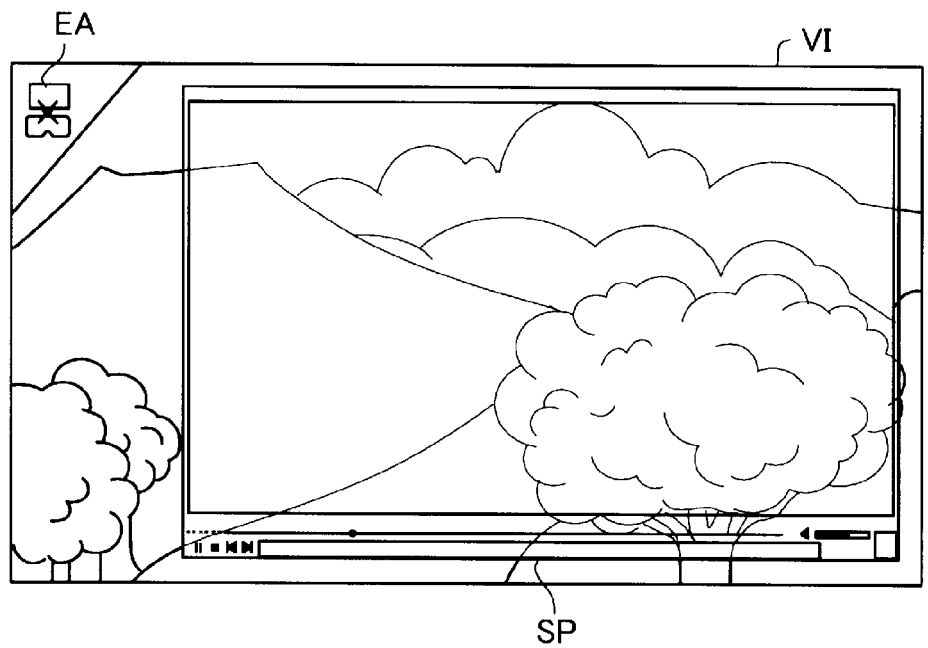

[Fig. 10]
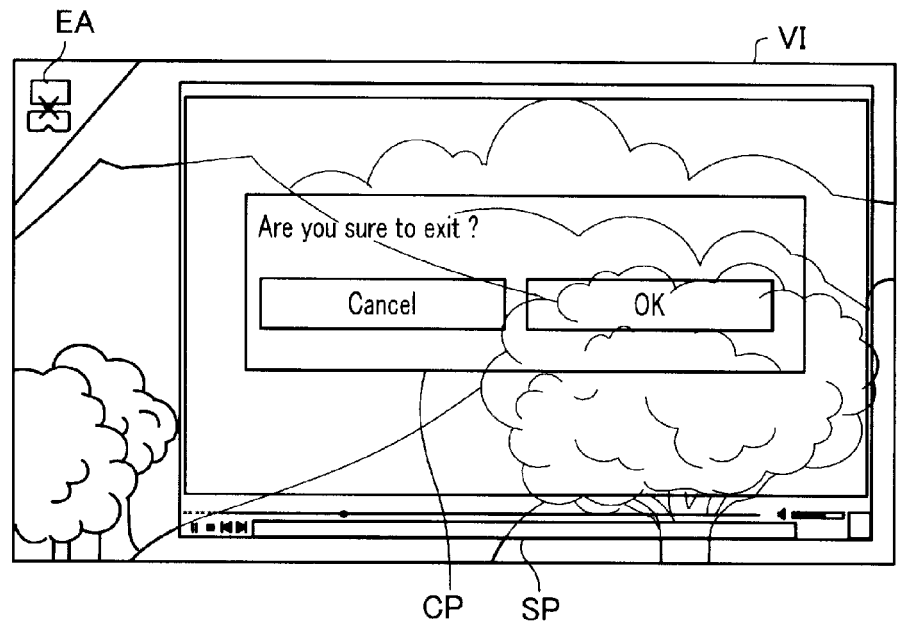
[Fig. 11]
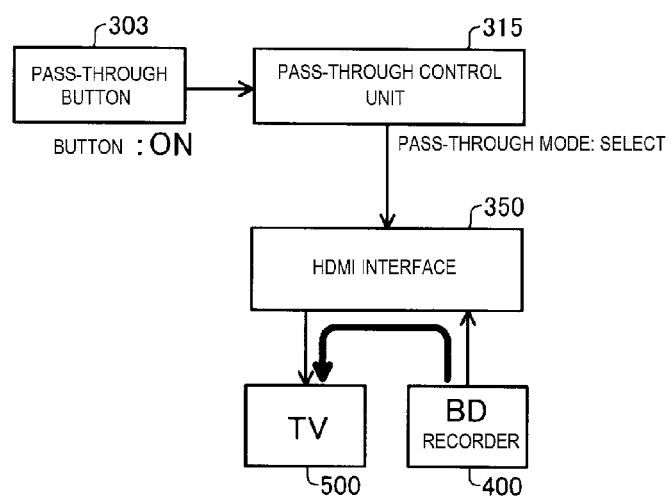

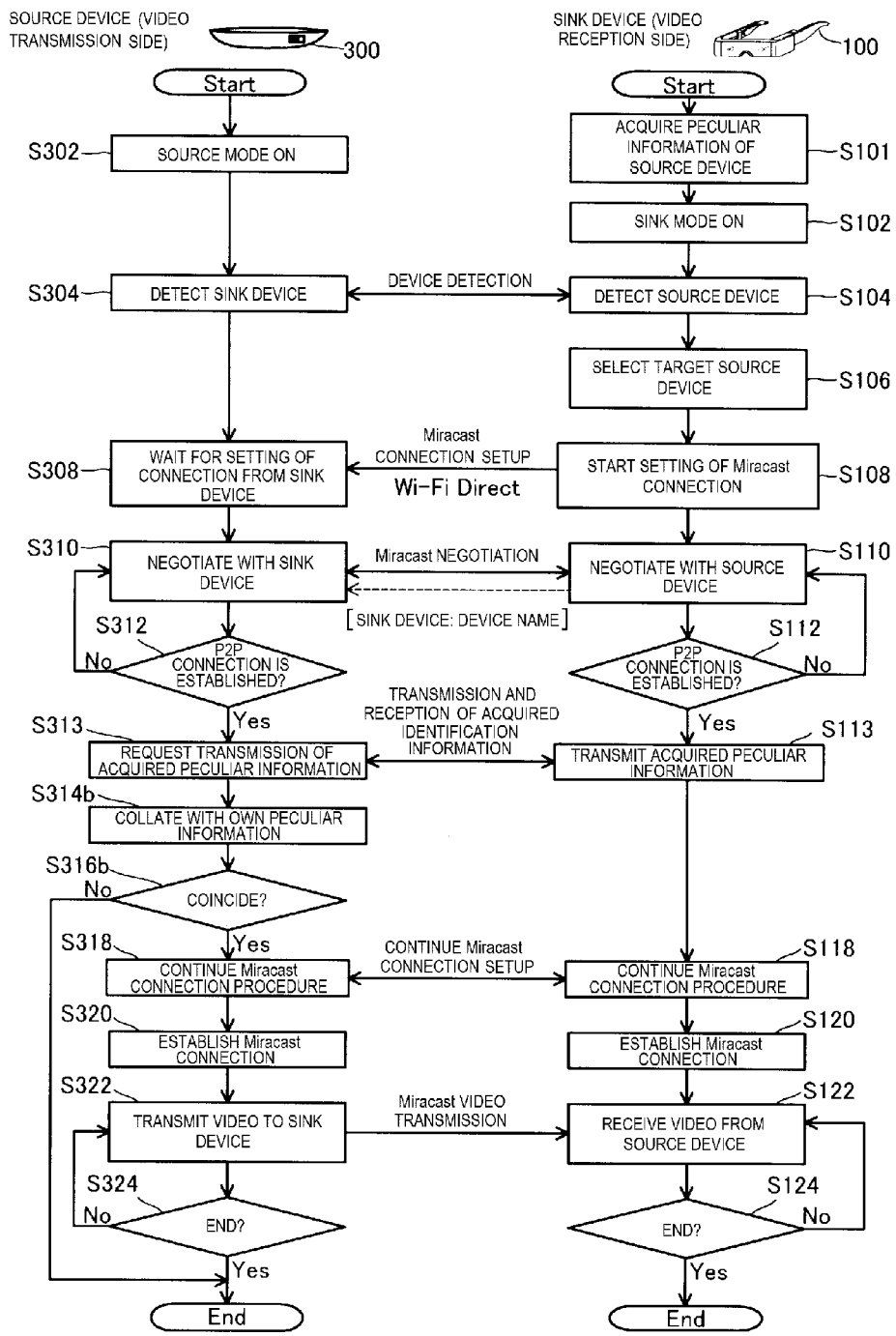

[Fig. 13]
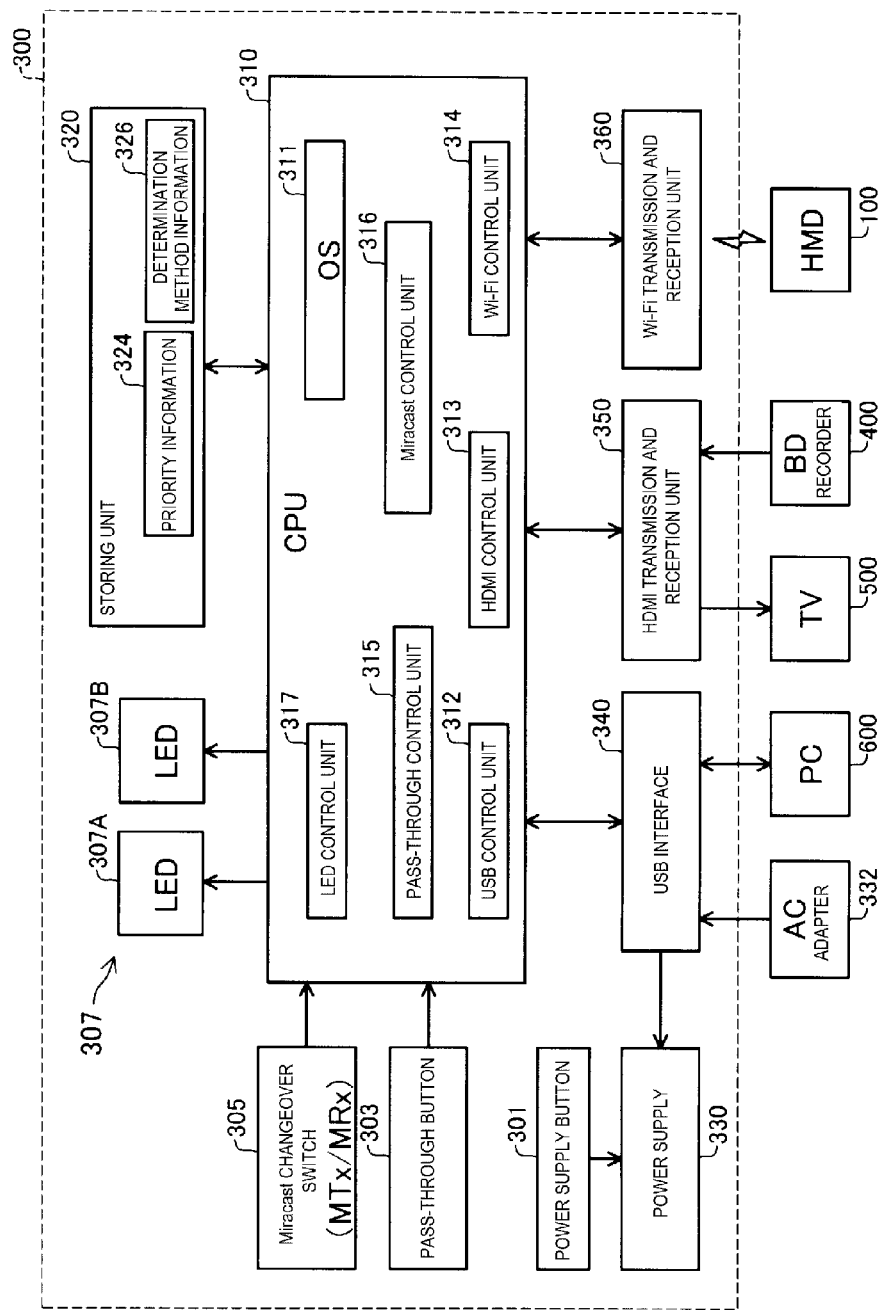

[Fig. 14]
| DEVICE IDENTIFIER | DEVICE NAME | PREDETERMINED PRIORITY LEVEL | RADIO WAVE INTENSITY | NUMBER OF TIMES OF CONNECTION | MOST RECENTLY CONNECTED DEVICE |
|---|---|---|---|---|---|
| 001 | HMD | 1 | −20dB | 21 | N |
| 002 | TV | 2 | −85dB | 10 | Y |
| 003 | PROJECTOR | 3 | −60dB | 3 | N |
| ... | ... | ... | ... | ... | ... |
324
[Fig. 15]
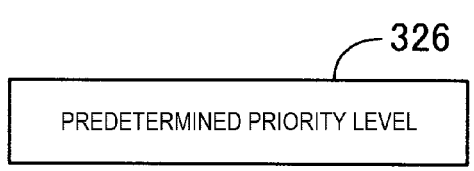
326
PREDETERMINED PRIORITY LEVEL

[Fig. 16]
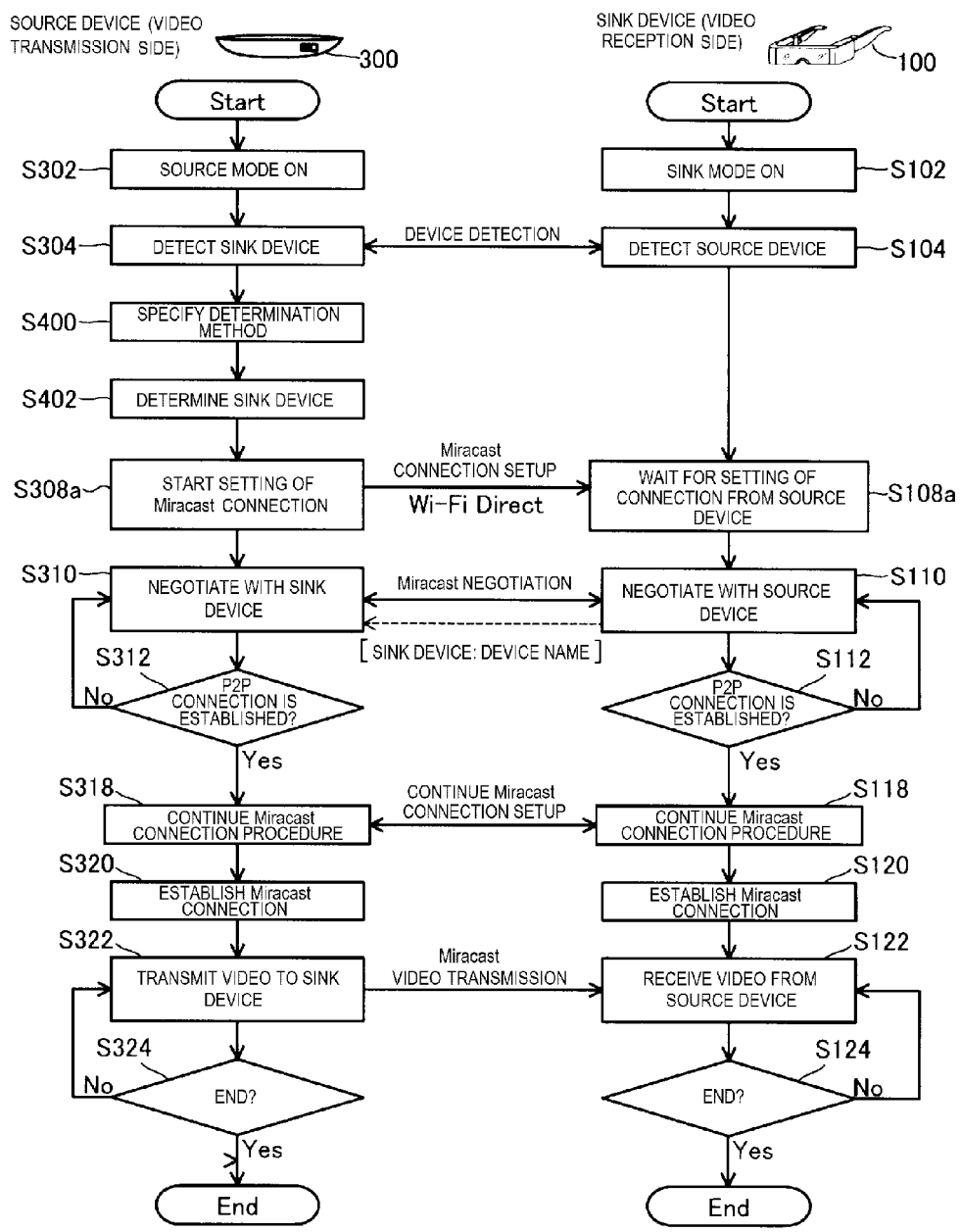

[Fig. 17]

| DEVICE IDENTIFIER | DEVICE NAME | PREDETERMINED PRIORITY LEVEL | RADIO WAVE INTENSITY | NUMBER OF TIMES OF CONNECTION | MOST RECENTLY CONNECTED DEVICE | OVERALL PRIORITY LEVEL |
| --- | --- | --- | --- | --- | --- | --- |
| 001 | HMD | 1 | 1 | 1 | 2 | 5 |
| 002 | TV | 2 | 3 | 2 | 1 | 8 |
| 003 | PROJECTOR | 3 | 2 | 3 | 2 | 10 |

VIDEO TRANSMISSION AND DISPLAY SYSTEM

TECHNICAL FIELD

The present invention relates to a video display system, a connection method conforming to a video radio transmission standard between a video transmission device and a video reception and display device configuring the video display system, and the video transmission device and the video reception and display device.

BACKGROUND ART

As a video radio transmission standard for transmitting a video and sound through one-to-one direct radio communication, for example, there is "Miracast" drawn up by the Wi-Fi Alliance. As devices compliant with the Miracast (also called "Wi-Fi Display (WFD)"), development of various devices such as a smartphone, a tablet terminal, a television set (hereinafter simply referred to as "television"), a display, a game machine, and an adapter is ongoing. For example, a device having a video output function such as a smartphone or a tablet terminal (also referred to as "source device") can directly transmit information concerning a video (also referred to as "image") to a device such as a television or a display (also referred to as "display device" or "sink device") by radio not via a radio network such as a Wi-Fi network, and display the video. The source device can transmit video information to a display device non-compliant with the Miracast (also referred to as "Miracast noncompliant sink device") using, as a mediation device, an adapter functioning as a sink device compliant with the Miracast and display the video.

CITATION LIST

Patent Literature

PTL 1: JP-T-2013-511235
PTL 2: JP-A-2012-44429

SUMMARY OF INVENTION

Technical Problem

When a video reproduced by a video reproduction device noncompliant with the Miracast (also referred to as "Miracast noncompliant source device") is displayed in the sink device, it is also conceivable to use, as a mediation device between the Miracast noncompliant source device and the sink device, an adapter functioning as a source device compliant with the Miracast. Examples of the video reproduction device include various devices such as a DVD (Digital Versatile Disk) recorder, a DVD player, a Blue-ray disk (BD) recorder, a BD player, an HDD (Hard Disk Drive) recorder, and a video camera. Examples of the sink device include various devices including a display unit and an operation unit such as a smartphone, a tablet terminal (a personal computer), a notebook PC, a portable information terminal, a projector, and a head-mounted display device (a head mounted display; HMD).

The adapter functioning as the source device compliant with the Miracast only has to be configured to include only a function of performing mediation between the Miracast noncompliant source device and the sink device. Therefore, it is desirable to omit a display unit and an operation unit for realizing an advanced user interface (e.g., a graphical user interface; the user interface is hereinafter simply referred to as "UI") usually included in a source device in the past such as a smartphone or a tablet terminal and attain a reduction in size and simplification.

However, the source device equipped with neither the display unit nor the operation unit for realizing the UI cannot select a sink device that should be connected to the source device. Therefore, there is a problem in that connection conforming to a procedure of the Miracast between the source device and the sink device cannot be established. Even if the display unit and the operation unit for realizing the UI are equipped in the sink device, for the connection of the source device and the sink device, there has been only a configuration adopting a procedure in which the source device side selects the sink device and connects to the sink device according to the procedure of the Miracast. There is no configuration in which the sink device side selects the source device and connects to the source device.

Note that Patent Literature 1 only discloses a search method and a device for the search method in a first WFD device corresponding to the source device of a Wi-Fi Display service supported in a second WFD device corresponding to the sink device. Therefore, in Patent Literature 1, there is neither description nor indication concerning the problem in that the connection conforming to the procedure of the Miracast between the source device equipped with neither the display unit nor the operation unit for realizing the UI and the sink device cannot be performed.

Patent Literature 2 discloses a video display system in which a portable information processing device and an HMD are connected by radio communication. As the radio communication, a Bluetooth (registered trademark) or a wireless LAN (Local Area Network) are only illustrated. Therefore, as in Patent Literature 1, in Patent Literature 2, there is neither description nor indication concerning the problem in that the connection conforming to the procedure of the Miracast between the source device equipped with neither the display unit nor the operation unit for realizing the UI and the sink device cannot be performed.

The problems are explained above with reference to the Miracast as an example. However, the problems are common to systems that connect a video transmission device and a video reception and display device according to a video radio transmission standard for transmitting a video and sound through one-to-one direct radio communication and transmit the video and the sound.

Solution to Problem

An advantage of some aspects of the invention is to solve at least a part of the problems and can be realized as the following aspects.

(1) An aspect of the invention is directed to a video display system that transmits a video from a video transmission device equipped with neither a display unit nor an operation unit for realizing a user interface to a video reception and display device according to a video radio transmission standard for transmitting a video through one-to-one direct radio communication and performs display. In the video display system, the video transmission device includes a connection control unit configured to control establishment of connection between the video transmission device and the video reception and display device, the connection control unit controlling establishment of first connection for connecting the video transmission device and the video reception and display device according to the video radio transmission standard and second connection for connecting the video transmission device and the video reception and display device peer-to-peer prior to the establishment of the first connection. The connection control unit starts processing of establishment of the second connection according to any one of acquisition of a request from the video reception and display device and occurrence of an opportunity in the video transmission device. With the video display system according to this aspect, the connection control unit of the video transmission device starts the processing of establishment of the second connection between the video transmission device and the video reception and display device according to any one of the acquisition of a request from the video reception and display device and the occurrence of an opportunity in the video transmission device. The second connection is peer-to-peer connection performed prior to the establishment of the first connection conforming to the video radio transmission standard. When starting the processing of establishment of the second connection according to the acquisition of a request from the video reception and display device, the connection control unit of the video transmission device can set the video reception and display device at a transmission source of the request as a partner of the second and first connections, that is, a partner of the connection conforming to the video radio transmission standard. When starting the processing of establishment of the second connection according to the occurrence of an opportunity in the video transmission device, the connection control unit of the video transmission device can set, for example, a video reception and display device decided by any method in the video transmission device as a partner of the second and first connections, that is, a partner of the connection conforming to the video radio transmission standard. As a result, with the video display system according to this aspect, even the video transmission device equipped with neither the display unit nor the operation unit for realizing the UI can specify a partner of the video radio communication. Therefore, it is possible to enable connection conforming to the video radio communication standard between the video transmission device and the video reception and display device.

(2) In the video display system according to the aspect, the connection control unit of the video transmission device may start processing of establishment of the second connection according to the acquisition of a request from the video reception and display device. When establishing the second connection, the video reception and display device may transmit connection identification information indicating that the video reception and display device is a connection target conforming to the video radio transmission standard to the video transmission device. The connection control unit of the video transmission device may establish the first connection if the connection identification information matches connection identification information stored in the video transmission device. With the video display system according to this aspect, when the connection identification information transmitted from the video reception and display device matches the connection identification information stored in the video transmission device, the video transmission device can select the video reception and display device as a connection target video reception and display device conforming to the video radio transmission standard and execute the processing of the first connection conforming to the video radio transmission standard between the video transmission device and the video reception and display device. Therefore, it is possible to solve the problem in that, since the video transmission device equipped with neither the display unit nor the operation unit for realizing the UI cannot select a video reception and display device that should be connected to the video transmission device, the connection conforming to the video radio communication standard between the video transmission device and the video reception and display device cannot be performed. Note that the transmission of the video is not limited to transmission of only a video signal representing a video and may be transmission including the video signal and a sound signal representing sound.

(3) In the video display system according to the aspect, the connection identification information can be identification information peculiar to the video reception and display device transmitted from the video reception and display device to the video transmission device in the processing of establishment of the second connection. With the video display system according to this aspect, by setting the identification information peculiar to the video reception and display device as the connection identification information, the video transmission device can easily select, in the processing of establishment of the peer-to-peer second connection, on the basis of the identification information peculiar to the video reception and display device necessarily transmitted to the video transmission device, the video reception and display device, which transmits the peculiar identification information, as a connection target video reception and display device conforming to the video radio transmission standard. The video transmission device can execute the processing of the first connection conforming to the video radio transmission standard between the video transmission device and the video reception and display device.

(4) In the video display system according to the aspect, the connection identification information may be peculiar information provided by the video transmission device. The video reception and display device may include a peculiar information acquisition device for acquiring the peculiar information. The video reception and display device can acquire the peculiar information with the peculiar information acquisition device before the start of the processing of establishment of the second connection and transmit the acquired peculiar information to the video transmission device as the connection identification information after the establishment of the second connection. With the video display system according to this aspect, after the establishment of the peer-to-peer second connection between the video transmission device and the video reception and display device, the video transmission device receives the peculiar information provided by the video transmission device, which is acquired by the video reception and display device in advance, from the video reception and display device as the connection identification information. The video transmission device can easily select, on the basis of the received peculiar information serving as the connection identification information, the video reception and display device, which transmits the peculiar information, as a connection target video reception and display device conforming to the video radio transmission standard. The video transmission device can execute the processing of the first connection conforming to the video radio transmission standard between the video transmission device and the video reception and display device.

(5) In the video display system according to the aspect, the acquisition of the peculiar information may be executed according to any one of the peculiar information acquisition device reading information concerning a QR code (registered trademark) provided in the video transmission device, the peculiar information acquisition device reading information concerning a specific display pattern provided in the video transmission device, the peculiar information acquisition device reading information concerning an RF tag provided in the video transmission device, and the peculiar information acquisition device reading information represented by a specific light emission pattern of light emission of a light emitting unit provided in the video transmission device. With the video display system according to this aspect, it is possible to easily acquire the peculiar information provided by the video transmission device.

(6) In the video display system according to the aspect, the video reception and display device may be a head-mounted display device. When the video transmission device is see-through displayed on the head-mounted display device, the peculiar information may be displayed over the video transmission device. With the video display system according to this aspect, it is possible to easily check, with the head-mounted display device, the video transmission device to which the peculiar information serving as the connection identification information is provided.

(7) In the video display system according to the aspect, the video reception and display device may include a peculiar information acquisition device for acquiring the peculiar information provided by the video transmission device. The connection control unit of the video transmission device may request the video reception and display device to transmit the peculiar information, start the processing of establishment of the second connection taking, as the opportunity, reception of the peculiar information transmitted from the video reception and display device, and establish the first connection when the peculiar information transmitted from the video reception and display device matches information stored in the video transmission device. With the video display system according to this aspect, the video transmission device can request the video reception and display device to transmit the peculiar information and, when the peculiar information transmitted from the video reception and display device matches the information stored in the video transmission device, select the video reception and display device as a connection target video reception and display device conforming to the video radio transmission standard, and execute the processing of the first connection conforming to the video radio transmission standard between the video transmission device and the video reception and display device. Therefore, it is possible to solve the problem in that, since the video transmission device equipped with neither the display unit nor the operation unit for realizing the UI cannot select a video reception and display device that should be connected to the video transmission device, the connection conforming to the video radio communication standard between the video transmission device and the video reception and display device cannot be performed.

(8) In the video display system according to the aspect, the connection control unit of the video transmission device may determine the video reception and display device to be a target of the connection, establish the second connection between the video transmission device and the determined video reception and display device taking the determination of the target of the connection as the opportunity, and, after the establishment of the second connection, establish the first connection between the video transmission device and the determined video reception and display device. With the video display system according to this aspect, the video transmission device can determine the video reception and display device to be a target of connection. Therefore, it is possible to solve the problem in that, since the video transmission device equipped with neither the display unit nor the operation unit for realizing the UI cannot select a video reception and display device that should be connected to the video transmission device, the connection conforming to the video radio communication standard between the video transmission device and the video reception and display device cannot be performed.

(9) In the video display system according to the aspect, the determination of a target of the connection may be executed on the basis of any one of a priority level stored in the video transmission device in advance, information concerning a radio wave of the video reception and display device received by the video transmission device, information in the past concerning the connection, and a combination of two or more of the priority level, the information concerning the radio wave, and the information in the past. With the video display system according to this aspect, the video transmission device can determine a target of the connection using information stored in the video transmission device (i.e., the priority level stored in the video transmission device in advance) and information that the video transmission device can automatically acquire (i.e., the information concerning a radio wave of the video reception and display device received by the video transmission device and the information in the past concerning the connection). Therefore, it is possible to solve the problem in that, since the video transmission device equipped with neither the display unit nor the operation unit for realizing the UI cannot select a video reception and display device that should be connected to the video transmission device, the connection conforming to the video radio communication standard between the video transmission device and the video reception and display device cannot be performed.

Note that the invention can be implemented in various forms described below.

(a) A video display system and a video display method (b) A connection method conforming to a video radio communication standard between a video transmission device and a video reception and display device in the video display system (c) The video transmission device corresponding to the video display system and the video reception and display device corresponding to the video display system

BRIEF DESCRIPTION OF DRAWINGS

FIG. 1 is an explanatory diagram showing a schematic configuration of a video display system in a first embodiment of the invention.

FIG. 2 is a block diagram functionally showing the configuration of a head mounted display.

FIG. 3 is an explanatory diagram showing an example of a virtual image visually recognized by a user.

FIG. 4 is a block diagram functionally showing the configuration of a Miracast adapter.

FIG. 5 is an explanatory diagram showing a procedure of connection conforming to Miracast performed between the Miracast adapter and an HMD when the Miracast adapter is in a source mode.

FIG. 6 is an explanatory diagram showing an example of a menu screen for Miracast connection.

FIGS. 7A and 7B are explanatory diagrams showing examples of a display screen of a connectable source device detected by source device detection in a sink device.

FIG. 8 is an explanatory diagram showing an example of a connectable device list stored in Miracast setting information in advance.

FIG. 9 is an explanatory diagram showing a video reproduction screen displayed in the HMD.

FIG. 10 is an explanatory diagram showing a confirmation screen displayed when an end icon shown in FIG. 9 is tapped.

FIG. 11 is a block diagram functionally showing the configuration of a Miracast adapter in a pass-through mode.

FIG. 12 is an explanatory diagram showing a procedure of connection conforming to the Miracast performed between the Miracast adapter and the HMD when the Miracast adapter is in the source mode in a second embodiment.

FIG. 13 is a block diagram functionally showing the configuration of the Miracast adapter in a third embodiment.

FIG. 14 is an explanatory diagram showing an example of priority information.

FIG. 15 is an explanatory diagram showing an example of determination method information.

FIG. 16 is an explanatory diagram showing a procedure of connection conforming to the Miracast performed between the Miracast adapter and the HMD when the Miracast adapter is in the source mode in the third embodiment.

FIG. 17 is a diagram for explaining a method of determining a sink device when a determination method for the sink device is "overall".

DESCRIPTION OF EMBODIMENTS

A First Embodiment

A1. Configuration of a Video Display System

FIG. 1 is an explanatory diagram showing a schematic configuration of a video display system 1000 in a first embodiment of the invention. The video display system 1000 includes a head-mounted display device 100, a Miracast adapter 300, a video apparatus 400, a display device 500, and a computer 600. The head-mounted display device 100 and the display device 500 are also called "video display device" or "image display device". As explained below, the video display system 1000 is a system that transmits a video to be reproduced by the video apparatus 400 noncompliant with the Miracast from the Miracast adapter 300 compliant with the Miracast to the head-mounted display device 100 compliant with the Miracast by radio and causes the head-mounted display device 100 to display the video. The video display system 1000 is also a system that transmits a video displayed or a video to be reproduced by the head-mounted display device 100 from the head-mounted display device 100 to the Miracast adapter 300 by radio and causes the TV 500 noncompliant with the Miracast to display the video. The Miracast is a standard drawn up by the Wi-Fi Alliance as one of video radio transmission standards for transmitting a video and sound (hereinafter simply abbreviated as "video and the like") through one-to-one direct radio communication. The transmission by the Miracast is applied to all of the case of only transmission of the video (specifically, transmission of video information), the case of transmission of the video and the sound (specifically, transmission including video information and sound information), and the case of only transmission of the sound. Note that the Miracast adapter 300 is equivalent to the video transmission device according to the aspect of the invention. The HMD 100 is equivalent to the video reception and display device according to the aspect of the invention.

In the Miracast adapter 300 in this embodiment, a display unit and an operation unit for realizing an advanced user interface (hereinafter the user interface is also simply referred to as "UI") usually included in a source device in the past are omitted. The advanced UI means an interface in general that a user can operate while viewing a character string and an image such as a graphical user interface, a text user interface, and a character user interface. That is, the Miracast adapter 300 in this embodiment does not include displays including, for example, a liquid crystal and an organic EL device and touch panels in which, for example, various systems are adopted.

The Miracast adapter 300 includes a power button 301, a pass-through button 303, a Miracast changeover switch 305, a lighting unit 307, not-shown HDMI (High-Definition Multimedia Interface; registered trademark) input terminal and output terminal, and not-shown two Micro USB (Universal Serial Bus) terminals.

An AC adapter 332 is connected to one Micro USB (hereinafter simply abbreviated as "USB") terminal via a USB cable 334. Supply of direct-current power to the Miracast adapter 300 is performed. A USB terminal of the computer 600 is connected to the other USB terminal via a USB cable 602. It is possible to perform wired communication between the Miracast adapter 300 and the computer 600. For example, it is possible to set operation conditions of the Miracast adapter 300 using the computer 600. Note that the computer 600 is an information communication terminal. In this embodiment, a notebook personal computer is illustrated as the computer 600. The computer 600 may be configured by other information communication terminals such as a desktop personal computer, a tablet terminal, a smartphone, a cellular phone, and a PDA (Personal Digital Assistant).

An HDMI output terminal (not shown) of the video apparatus 400 is connected to the HDMI input terminal via an HDMI cable 402. It is possible to transmit a video and the like to be reproduced by the video apparatus 400 to the Miracast adapter 300 via the HDMI cable 402. An HDMI input terminal (not shown in the figure) of the display device 500 is connected to the HDMI output terminal of the Miracast adapter 300 via an HDMI cable 502. The display device 500 is capable of performing display and output of a video and sound (hereinafter also referred to as "reproduction of a video and the like") transmitted from the Miracast adapter 300 via the HDMI cable 502.

The Miracast changeover switch 305 is a switch for selecting any one of two modes, i.e., a source mode MTx and a sink mode MRx. When the user selects the source mode MTx using the Miracast changeover switch 305, the Miracast adapter 300 changes to a state in which the Miracast adapter 300 is capable of executing a function of transmitting a video and the like, which are input from an external device according to the HDMI, by radio according to the Miracast (hereinafter referred to as "source function" or "source mode"). On the other hand, when the user selects the sink mode MRx using the Miracast changeover switch 305, the Miracast adapter 300 is capable of executing a function of transmitting a video and the like, which are received by radio according to the Miracast, to the external device by wire according to the HDMI (hereinafter also referred to as "sink function" or "sink mode"). In this embodiment, as explained below, the Miracast adapter 300 is connected to the head-mounted display device 100 by radio in the source mode or the sink mode according to the Miracast.

The lighting unit 307 includes two LEDs (Light Emitting Diodes) 307A and 307B. The lighting unit 307 notifies an operation state of the Miracast adapter 300, for example, ON/OFF of a power supply and a mode state using light emission states of the two LEDs 307A and 307B. The power supply button 301 switches an operation state (operate/stop) of the Miracast adapter 300 according to ON/OFF of the button. The pass-through button 303 switches selection/non-selection of a pass-through mode according to ON/OFF of the button. As explained below, when the pass-through mode is selected, a video and the like input to the HDMI input terminal are directly output from the HDMI output terminal.

The video apparatus 400 is configured by various video reproduction apparatuses corresponding to the HDMI (High-Definition Multimedia Interface; registered trademark) such as a DVD recorder, a DVD player, a BD recorder, a BD player, an HDD recorder, a video camera, and an information communication terminal. As explained below, a video and the like reproduced by the video apparatus 400 is transmitted to the Miracast adapter 300 via the HDMI cable 402, transmitted by radio to the head-mounted display device 100 according to the Miracast, and reproduced by the head-mounted display device 100. Note that, in this embodiment, the video apparatus 400 is configured by a BD recorder. The video apparatus 400 is also referred to as "BD recorder 400".

The display device 500 is configured by various video display devices (image display devices) compliant with the HDMI such as a television (hereinafter also referred to as "TV"), a display, and a projector. As explained below, the display device 500 displays a video and the like transmitted from the head-mounted display device 100 to the Miracast adapter 300 by radio according to the Miracast and transmitted to the display device 500 by wire via the HDMI cable 502. Further, the display device 500 reproduces a video and the like transmitted from the video apparatus 400 to the Miracast adapter 300 by wire via the HDMI cable 402 and transmitted to the display device 500 by wire via the HDMI cable 502. Note that, in this embodiment, the display device 500 is configured by a TV. The display device 500 is also referred to as "TV 500".

The head-mounted display device 100 is an image display device (the video display device) worn on a head. The head-mounted display device 100 is also called head mounted display (HMD). The head mounted display (HMD) 100 in this embodiment is a head-mounted display device of an optical transmission type with which the user is capable of visually recognizing a virtual image and at the same time directly visually recognizing an outside scene. The HMD 100 includes an image display unit 20 that causes the user to visually recognize the virtual image in a state in which the image display unit 20 is worn on the head of the user and a control unit (a controller) 10 that controls the image display unit 20.

The image display unit 20 is a wearing body worn on the head of the user. In this embodiment, the image display unit 21 has a spectacles like shape. The image display unit 20 includes a right holding unit 21, a right display driving unit 22, a left display driving unit 24, a left holding unit 23, a right optical-image display unit 26, and a left optical-image display unit 28. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead when the user wears the image display unit 20. A camera 67 is arranged in this connecting section.

The right holding unit 21 and the left holding unit 23 are members that hold the image display unit 20 on the head of the user like the temples of eyeglasses. The right display driving unit 22 is arranged on the inner side of the right holding unit 21, in other words, a side opposed to the head of the user when the user wears the image display unit 20. The left display driving unit 24 is arranged on the inner side of the left holding unit 23. Note that, in the following explanation, the right holding unit 21 and the left holding unit 23 are sometimes explained as "holding units" without being distinguished. Similarly, the right display driving unit 22 and the left display driving unit 24 are sometimes explained as "display driving units" without being distinguished. The right optical-image display unit 26 and the left optical-image display unit 28 are sometimes explained as "optical-image display units" without being distinguished.

The image display unit 20 further includes a connecting unit 40 for connecting the image display unit 20 to the control unit 10. The connecting unit 40 includes a main body cord 48 connected to the control unit 10, a right cord 42 and a left cord 44 formed by dividing the main body cord 48 into two, and a coupling member 46 provided in a division point. A jack for connecting an earphone plug 30 is provided in the coupling member 46. A right earphone 32 and a left earphone 34 extend from the earphone plug 30.

The image display unit 20 and the control unit 10 perform transmission of various signals via the connecting unit 40. Connectors (not shown in the figure) fitting with each other are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. A metal cable or an optical fiber can be adopted as the connecting unit 40.

The control unit 10 is a device for controlling the HMD 100. The control unit 10 includes a lighting unit 12, a touch pad 14, a cross key 16, and a power switch 18. The lighting unit 12 notifies an operation state (e.g., ON/OFF of the power supply) of the HMD 100 using a light emission state of the lighting unit 12. As the lighting unit 12, for example, an LED can be used. The touch pad 14 detects contact operation on an operation surface of the touch pad 14 and outputs a signal corresponding to detection content. As the touch pad 14, various touch pads such as an electrostatic type, a pressure detection type, and an optical type can be adopted. The cross key 16 detects pressing of keys corresponding to the up, down, left, and right directions and outputs a signal corresponding to detection content. The power switch 18 detects sliding of the switch to switch a state of the power supply of the HMD 100.

As explained above, when the Miracast adapter 300 operates in the source mode, the control unit 10 receives a video and the like transmitted from the Miracast adapter 300 by radio according to the Miracast, transmits the video to the image display unit 20 via the connecting unit 40, and outputs the sound from the earphones 32 and 34. As explained above, when the Miracast adapter 300 operates in the sink mode, the control unit 10 transmits a video and the like, which are transmitted from the image display unit 20 via the connecting unit 40, to the Miracast adapter 300 according to the Miracast by radio. Note that establishment of connection conforming to the Miracast between the Miracast adapter 300 and the control unit 10 of the HMD 100 is explained in detail below.

A2. Configuration of the Head-Mounted Display Device

FIG. 2 is a block diagram functionally showing the configuration of the head mounted display (HMD) 100. The control unit 10 includes an input-information acquiring unit 110, a storing unit 120, a power supply 130, a radio communication unit 132, a GPS module 134, a CPU 140, an interface 180, and transmitting units (Txs) 51 and 52. The units are connected to one another by a not-shown bus.

The input-information acquiring unit 110 acquires signals corresponding to operation inputs to the touch pad 14, the cross key 16, the power switch 18, and the like. Note that, although not shown in the figure, the input-information acquiring unit 110 can also acquire signals corresponding to visual line detection, touch detection, and an operation input to an input device such as a microphone. Specifically, in the visual line detection, a visual line of the user is detected using an infrared sensor or the like. In this case, movements of the visual line and commands are associated with each other in advance. In the touch detection, touches of the user on touch sensors provided in any places of a housing of the HMD 100 (e.g., on the outer sides of the right holding unit 21 and the left holding unit 23 (FIG. 1) of the image display unit 20) are detected.

The storing unit 120 is configured by a ROM, a RAM, a DRAM, a hard disk, or the like. Computer programs to be read out and executed by the CPU 140 and various kinds of data information are stored in the storing unit 120. The power supply 130 supplies electric power to the units of the HMD 100. As the power supply 130, for example, a secondary battery can be used.

The radio communication unit 132 performs radio communication between the radio communication unit 132 and an external device according to a predetermined radio communication standard (e.g., short range radio communication illustrated by an infrared ray and a Bluetooth (registered trademark), a wireless LAN illustrated by Wi-Fi (IEEE802.11), etc.). In this embodiment, the radio communication unit 132 complies with at least "Wi-Fi", "Wi-Fi Direct", and "Miracast" drawn up by the Wi-Fi Alliance. The GPS module 134 receives a signal from the GPS satellite to thereby detect the present position of the user of the HMD 100 and generates present position information representing present position information of the user. Note that the present position information can be realized by, for example, coordinates representing the latitude and the longitude.

The CPU 140 reads out and executes the computer programs stored in the storing unit 120 to thereby function as an operating system (OS) 150, an image processing unit 160, a sound processing unit 170, a camera control unit 175, a display control unit 190, and a Miracast control unit 195.

The image processing unit 160 generates a signal on the basis of video signals input from the interface 180, the radio communication unit 132, and the camera 67. The image processing unit 160 supplies the generated signal to the image display unit 20 via the connecting unit 40 to control display in the image display unit 20. The signal to be supplied to the image display unit 20 is different in an analog form and a digital form.

For example, in the case of the digital form, a video signal in a state of synchronization of a digital R signal, a digital G signal, a digital B signal, and a clock signal PCLK is input. The image processing unit 160 executes, according to necessity, wellknown image processing such as resolution conversion processing, various kinds of color tone correction processing such as adjustment of luminance and chroma, and keystone correction processing on image data Data consisting of the digital R signal, the digital G signal, and the digital B signal. Thereafter, the image processing unit 160 transmits the clock signal PCLK and the image data Data via the transmitting units 51 and 52.

In the case of the analog form, a video signal consisting of an analog R signal, an analog G signal, an analog B signal, a vertical synchronization signal VSync, and a horizontal synchronization signal HSync is input. The image processing unit 160 separates the vertical synchronization signal VSync and the horizontal synchronization signal HSync from the input signal and generates, according to cycles of the vertical synchronization signal VSync and the horizontal synchronization signal HSync, the clock signal PCLK using a not-shown PLL circuit or the like. The image processing unit 160 converts the analog R signal, the analog G signal, and the analog B signal into digital signals using an A/D conversion circuit and the like. The image processing unit 160 executes, according to necessity, the wellknown image processing on the image data Data consisting of the digital R signal, the digital G signal, and the digital B signal after the conversion and then transmits the clock signal PCLK, the image data Data, the vertical synchronization signal VSync and the horizontal synchronization signal HSync via the transmitting units 51 and 52. Note that, in the following explanation, the image data Data transmitted via the transmitting unit 51 is referred to as "image data for right eye Data1" and the image data Data transmitted via the transmitting unit 52 is referred to as "image data for left eye Data2".

The display control unit 190 generates control signals for controlling the right display driving unit 22 and the left display driving unit 24. The control signals are signals for individually switching driving ON/OFF of driving of a right LCD 241 by a right LCD control unit 211, driving ON/OFF of a right backlight 221 by a right backlight control unit 201, driving ON/OFF of a left LCD 242 by a left LCD control unit 212, and driving ON/OFF of a left backlight 222 by a left backlight control unit 202. The display control unit 190 controls, according to the control signals, generation and emission of image light in the right display driving unit 22 and the left display driving unit 24. The display control unit 190 transmits the generated control signals via the transmitting units 51 and 52.

The sound processing unit 170 acquires a sound signal included in contents, amplifies the acquired sound signal, and supplies the sound signal to a not-shown speaker of the right earphone 32 and a not-shown speaker of the left earphone 34. Note that, although not shown in the figure, the sound processing unit 170 can also sample sound detected by a microphone provided in at least one of the control unit 10 and the image display unit 20 and acquire a sound signal.

The camera control unit 175 controls the operation of the camera 67 and photographs a video visually recognized by the user. The photographed video can be stored in the storing unit 120.

The interface 180 performs wired communication between the interface 180 and an external device OA according to a predetermined wired communication standard (e.g., Micro USB, USB, HDMI, DVI (Digital Visual Interface), VGA (Video Graphics Array), composite, RS-232C (Recommended Standard 232), and wired LAN illustrated by IEEE802.3). As the external device OA, there are, for example, a PC, a cellular phone (including a smartphone), and a game terminal.

As explained below, the Miracast control unit 195 establishes connection conforming to the Miracast between the Miracast control unit 195 and the HMD 100 via the radio communication unit 132. In the case of the sink mode, the Miracast control unit 195 receives, in the radio communication unit 132, a video and the like transmitted from the Miracast adapter 300 by radio according to the Miracast, displays the video in the image display unit 20 via the image processing unit 160 and the display control unit 190, and outputs the sound to the earphones 32 and 34 via the sound processing unit 170. In the case of the source mode, the Miracast control unit 195 transmits a video and the like from the radio communication unit 132 to the Miracast adapter 300 by radio according to the Miracast. Note that examples of the video and the like transmitted to the Miracast adapter 300 by radio include a video photographed by the camera 67 and sound collected by the microphone and various contents supplied from the external device OA via the interface 180.

The image display unit 20 includes the right display driving unit 22, the left display driving unit 24, a right light guide plate 261 functioning as the right optical-image display unit 26 (FIG. 1), a left light guide plate 262 functioning as the left optical-image display unit 28 (FIG. 1), and a nine-axis sensor 66. The nine-axis sensor 66 is a motion sensor that detects acceleration (three axes), angular velocity (three axes), and terrestrial magnetism (three axes).

The right display driving unit 22 and the left display driving unit 24 generate image light representing an image and emit the image light using a liquid crystal display (hereinafter referred to as "LCD") and a projection optical system. The right display driving unit 22 includes a receiving unit (Rx) 53, the right backlight (BL) control unit 201 and the right backlight (BL) 221 functioning as a light source, the right LCD control unit 211 and the right LCD 241 functioning as a display device, and a right projection optical system 251.

The receiving unit 53 receives data transmitted from the transmitting unit 51. The right backlight control unit 201 drives the right backlight 221 on the basis of an input control signal. The right backlight 221 is a light emitting body such as an LED or an electroluminescence (EL) device. The right LCD control unit 211 drives the right LCD 241 on the basis of the clock signal PCLK, the image data for right eye Data1, the vertical synchronization signal VSync, and the horizontal synchronization signal HSync input thereto. The right LCD 241 is a transmission-type liquid crystal panel on which a plurality of pixels are arranged in a matrix shape. By driving a liquid crystal in the positions of the pixels arranged in the matrix shape, the right LCD 241 changes transmittance of light transmitted through the right LCD 241 to thereby modulate illumination light irradiated from the right backlight 221 into effective image light representing an image. The right projection optical system 251 is configured by a collimate lens that changes the image light emitted from the right LCD 241 to a light beam in a parallel state.

The left display driving unit 24 has a configuration substantially the same as the configuration of the right display driving unit 22 and operates in the same manner as the right display driving unit 22. That is, the left display driving unit 24 includes a receiving unit (Rx) 54, the left backlight (BL) control unit 202 and the left backlight (BL) 222 functioning as a light source, the left LCD control unit 212 and the left LCD 242 functioning as a display device, and a left projection optical system 252. Detailed explanation of the left display driving unit 24 is omitted. Note that, in this embodiment, a backlight system is adopted. However, image light may be emitted using a front light system and a reflection system.

The right optical-image display unit 26 and the left optical-image display unit 28 are arranged to be respectively located in front of the left and right eyes of the user when the user wears the image display unit 20 (see FIG. 1). The right optical-image display unit 26 includes the right light guide plate 261 and a not-shown dimming plate. The right light guide plate 261 is formed by a light transmissive resin material or the like. The right light guide plate 261 guides the image light, which is output from the right display driving unit 22, to a right eye RE of the user while reflecting the image light along a predetermined optical path. In the right guide plate 261, a diffraction grating may be used or a semitransparent reflection film may be used. The dimming plate is a thin plate-like optical element and is arranged to cover the front side of the image display unit 20 (not shown in the figure). The dimming plate protects the right light guide plate 261 and suppresses damage, adhesion of stain, and the like to the right light guide plate 261. By adjusting light transmittance of the dimming plate, it is possible to adjust an external light amount entering the eyes of the user and adjust easiness of visual recognition of a virtual image. Note that the dimming plate can be omitted.

The left optical-image display unit 28 has a configuration substantially the same as the right optical-image display unit 26 and operates in the same manner as the right optical-image display unit 26. That is, the left optical-image display unit 28 includes the left light guide plate 262 and a not-shown dimming plate. The left optical-image display unit 28 guides the image light, which is output from the left display driving unit 24, to a left eye LE of the user. Detailed explanation of the left optical-image display unit 28 is omitted.

FIG. 3 is an explanatory diagram showing an example of a virtual image visually recognized by the user. In FIG. 3, a visual field VR of the user is illustrated. As explained above, the image light guided to both the eyes of the user of the HMD 100 is imaged on the retinas of the user. Consequently, the user can visually recognize a virtual image VI. In the example shown in FIG. 3, the virtual image VI is a standby screen of an OS of the HMD 100. The user visually recognizes an outside scene SC through the right optical-image display unit 26 and the left optical-image display unit 28. In this way, concerning a portion where the virtual image VI is displayed in the visual field VR, the user of the HMD 100 in this embodiment can view the virtual image VI and the outside scene SC in the back of the virtual image VI. Concerning a portion where the virtual image VI is not displayed in the visual field VR, the user can directly view the outside scene SC through the right optical-image display unit 26 and the left optical-image display unit 28. The user can block the outside scene SC and view only the virtual image VI and can view, as the virtual image VI, a video transmitted from the Miracast adapter 300 by radio according to the Miracast. Note that, in this specification, "the HMD 100 displays a video (an image)" includes causing the user of the HMD 100 to visually recognize a virtual image.

A3. Configuration of the Miracast Adapter

FIG. 4 is a block diagram functionally showing the configuration of the Miracast adapter 300. The Miracast adapter 300 includes a CPU 310, a storing unit 320, a power supply 330, a USB interface 340, an HDMI transmission and reception unit 350, and a Wi-Fi transmission and reception unit 360 in addition to the power button 301, the pass-through button 303, the Miracast changeover switch 305, and the lighting unit 307 (the LEDs 307A and 307B) shown in FIG. 1. The respective units are connected one another via a bus not shown in the figure.

The storing unit 320 is configured by a ROM, a RAM, or the like. Computer programs read out and executed by the CPU 310 and various kinds of data information are stored in the storing unit 320. Note that, in FIG. 4, a state in which Miracast setting information 322 is stored in the storing unit 320 is shown. The Miracast setting information 322 includes, for example, information concerning forms of display, audio, and video besides information used as explained below when connection conforming to the Miracast executed by a Miracast control unit 316 is established.

The power supply 330 supplies electric power to the units of the Miracast adapter 300 when the power button 301 is on. As the power supply 330, for example, a secondary battery can be used. The power supply 330 can be charged by supplying direct-current power from the AC adapter 332 via the USB interface 340.

The CPU 310 reads out and executes the computer programs stored in the storing unit 320 to thereby function as various control units such as an operating system (OS) 311, a USB control unit 312, an HDMI control unit 313, a Wi-Fi control unit 314, a pass-through control unit 315, the Miracast control unit 316, and an LED control unit 317.

The USB control unit 312 controls an operation conforming to the USB of the USB interface 340. Consequently, the USB interface 340 executes communication conforming to the USB between the USB interface 340 and the computer 600. The USB interface 340 executes supply of the direct-current power, which is supplied from the AC adapter 332, to the power supply 330.

The HDMI control unit 313 controls the operation of the HDMI transmission and reception unit 350. Consequently, the HDMI transmission and reception unit 350 receives a video and the like transmitted from the BD recorder 400 according to the HDMI. As explained below, the HDMI transmission and reception unit 350 transmits, according to the HDMI, the video and the like received from the BD recorder 400 or a video and the like received from the HMD 100 by radio according to the Miracast.

The pass-through control unit 315 controls the operation of the HDMI transmission and reception unit 350 when the pass-through button 303 is on and causes the HDMI transmission and reception unit 350 to directly output a video and the like, which are input from the HDMI input terminal, to the HDMI output terminal. In this embodiment, the pass-through control unit 315 transmits the video and the like conforming to the HDMI, which are received from the BD recorder 400, to the TV 500 according to the HDMI and causes the TV 500 to display the video.

As explained below, the Miracast control unit 316 controls the Wi-Fi transmission and reception unit 360 via the Wi-Fi control unit 314 and establishes connection conforming to the Miracast between the Wi-Fi transmission and reception unit 360 and the HMD 100. In the case of the source mode, the Miracast control unit 316 transmits a video and the like, which are input from the BD recorder 400 connected to the HDMI input terminal of the HDMI transmission and reception unit 350, from the Wi-Fi transmission and reception unit 360 to the HMD 100 by radio according to the Miracast by radio. The HMD 100 executes display and output of the video and the sound transmitted from the DB recorder 400 by radio via the Miracast adapter 300. In the case of the sink mode, the Miracast control unit 316 receives a video and the like, which are transmitted from the HMD 100 by radio according to the Miracast, in the Wi-Fi transmission and reception unit 360 and outputs the video and the like to the TV 500 connected to the HDMI output terminal of the HDMI transmission and reception unit 350. The TV 500 executes display and output of the video and the sound transmitted from the HMD 100 to the Miracast adapter 300 by radio.

As explained below, the Miracast adapter 300 has a characteristic in a procedure of establishment of connection conforming to the Miracast executed between the Miracast adapter 300 and the HMD 100, in particular, a procedure of establishment of connection in the source mode.

A4. Connection Conforming to the Miracast (1) When the Miracast Adapter is in the Source Mode A procedure of connection conforming to the Miracast (hereinafter also referred to as "Miracast connection") performed between a source device and a sink device when the Miracast adapter is in the source mode, that is, when the Miracast adapter 300 is the source device on a video transmission side and the HMD 100 is the sink device on a video reception side is explained.

FIG. 5 is an explanatory diagram showing a procedure of connection conforming to the Miracast performed between the Miracast adapter 300 and the HMD 100 when the Miracast adapter 300 is in the source mode. The user sets the power button 301 to ON, whereby the Miracast adapter 300 starts. In this case, the user selects the source mode MTx using the Miracast changeover switch 305, whereby the Miracast control unit 316 starts an operation in the source mode (step S302) and performs detection of a sink device on a video reception side and detection of an ability (also referred to as "service") available by the Miracast of the sink device (step S304). Note that the detections are executed according to rules of Wi-Fi Peer-to-Peer (also referred to as "P2P") specifications drawn up by the Wi-Fi Alliance.

On the other hand, in the HMD 100 functioning as the sink device, the user selects an icon for Miracast execution (an icon inscribed as "Miracast" in FIG. 3) and executes an application for Miracast connection, whereby the Miracast control unit 195 starts an operation and displays a menu screen for the Miracast connection in the image display unit 20.

FIG. 6 is an explanatory diagram showing an example of a menu screen MV for the Miracast connection. When the user sets a mode changeover switch MS of the menu screen MV to a sink mode (Sink) side and taps (selects) a start button ST, the Miracast control unit 195 starts an operation in the sink mode (step S102) and performs detection of a source device on a video transmission side and detection of an ability (also referred to as "service") available by the Miracast of the source device (step S104). Note that the detections are executed according to the rules of the P2P specifications as on the source device side.

After performing the detection of the sink device (step S304), the Miracast control unit 316 (hereinafter also simply referred to as "source device" for convenience of explanation) of the Miracast adapter 300 stays on standby until setting of connection in the Miracast is started from the sink device (step S308). On the other hand, after performing the detection of the source device (step S104), the user performs selection of a connection target source device (step S106), whereby the Miracast control unit 195 (hereinafter also simply referred to as "sink device" for convenience of explanation) of the HMD 100 starts setting of the Miracast connection (setup of connection) for the source device (step S108). Note that the start of the setup of the connection is triggered by the start of P2P connection between the source device and the sink device conforming to Wi-Fi Direct or TDLS (Tunneled Direct Link Setup) specifications drawn up by the Wi-Fi Alliance.

FIGS. 7A and 7B are explanatory diagrams showing examples of a display screen SD of a connectable source device detected by the source device detection in the sink device. As shown in FIG. 7A, on the display screen SD, a device name (in the example shown in the figures, described as "-WFD_*") and an inscription indicating whether the device is connectable as a state of the device (in the example shown in FIG. 7A, inscribed as "Available" indicating a connectable state) are displayed in a display field of connectable source devices (AVAILABLE DEVICES) on the basis of a detection result of source devices. The user can perform selection of a source device by tapping a device name of a connection target source device out of the connectable (available) source devices.

When the setting of the Miracast connection is started, the source device and the sink device perform negotiation for establishment of connection of the P2P by the Wi-Fi Direct each other (steps S310 and S110) and establish the connection of the P2P by the Wi-Fi Direct (steps S312 and S112). When the connection of the P2P by the Wi-Fi Direct is established, as shown in FIG. 7B, the inscription of the state of the connection target source device changes to a connected state ("Connected"). Note that, in the negotiation, the device name (see FIG. 7A) and a MAC address (Media Access Control address) of the sink device are transmitted from the sink device to the source device.

Subsequently, the source device collates the device name received from the sink device during the negotiation with a list of connectable sink devices (hereinafter referred to as "connectable device list") stored in the Miracast setting information 322 in advance (step S316). FIG. 8 is an explanatory diagram showing an example of a connectable device list DL stored in the Miracast setting information 322 in advance. The connectable device list DL is stored in the Miracast setting information 322 in advance during product shipment. Note that it is also possible to set update of the connectable device list DL from the computer 600 via the USB.

When a device name coinciding with the device name received from the sink device is absent in the connectable device list DL (No in step S316), the source device determines that connection of the sink device may be impossible and ends the processing of the Miracast connection. On the other hand, when a device name coinciding with the device name received from the sink device is present in the connectable device list DL (Yes in step S316), the source device continues the setting of the Miracast connection between the source device and the sink device (step S318). In response to the continuation of the setting of the Miracast connection, the sink device also continues the setting of the Miracast connection between the sink device and the source device (step S118). As a result, the source device and the sink device establish the Miracast connection (steps S320 and S120).

When the Miracast connection is established between the source device and the sink device, the Miracast adapter 300, which is the sink device, can transmit a video and the like to be reproduced by the BD recorder 400 functioning as a video apparatus to the HMD 100, which is the source device, by radio according to the Miracast (steps S322 and S122). FIG. 9 is an explanatory diagram showing a video reproduction screen SP displayed in the HMD 100. As shown in FIG. 9, the HMD 100 reproduces and displays the received video on the video reproduction screen SP and outputs the received sound to the earphones 32 and 34.

The radio transmission of the video and the like conforming to the Miracast is continued until a procedure for ending a session in the Miracast is performed by the source device or the sink device (steps S324 or S124). In the Miracast adapter 300, which is the source device, for example, the ending procedure is executed by setting the power button 301 to OFF. In the HMD 100, the ending procedure is executed by tapping (selecting) an end icon (EA) at the upper left of FIG. 9. FIG. 10 is an explanatory diagram showing a confirmation screen CP displayed when the end icon EA shown in FIG. 9 is tapped. As shown in FIG. 10, when the end icon EA is tapped, as the confirmation screen CP, confirmation display "Are you sure to exit?", a cancel button, and an OK button are displayed. The user selects the OK button, whereby the ending procedure for the session in the Miracast is executed. If the user selects the cancel button, the session in the Miracast is continued.

Note that the device name of the HMD 100 is the identification information peculiar to the video reception and display device according to the aspect of the invention and is equivalent to connection permission identification information (also referred to as "connection identification information") indicating that the HMD 100 is a connection permission target (also referred to as "connection target") conforming to the video radio transmission standard. In the above explanation, the Miracast control unit 316 of the Miracast adapter 300 functions as "the connection control unit of the video transmission device". The Miracast control unit 195 of the HMD 100 functions as "the reception side connection control unit of the video reception and display device". In the above explanation, the Miracast connection is equivalent to the "first connection". The connection of the P2P by the Wi-Fi Direct is equivalent to the "second connection". Note that the Miracast is a protocol operating on the basis of a protocol of the P2P by the Wi-Fi Direct. That is, the Wi-Fi Direct is a low-order protocol and the Miracast is a high-order protocol.

(2) When the Miracast Adapter is in the Pass-Through Mode

The operation of the Miracast adapter 300 performed when the Miracast adapter is in the pass-through mode, that is, when the pass-through button 303 is set to ON and the pass-through mode is selected in a state in which the user selects the source mode MTx using the Miracast changeover switch 305 is explained.

FIG. 11 is a block diagram functionally showing the configuration of the Miracast adapter 300 in the pass-through mode. FIG. 11 shows only components necessary for explanation of the pass-through mode. The other components are omitted. When the pass-through button 303 is set to ON and the pass-through mode is selected in a state in which the user selects the source mode MTx using the Miracast changeover switch 305 (see FIGS. 1 and 4), the pass-through control unit 315 controls the operation of the HDMI transmission and reception unit 350 and causes the HDMI transmission and reception unit 350 to directly output signals of a video and the like, which are input from the HDMI input terminal, from the HDMI output terminal. Consequently, it is possible to directly output a video and the like, which are output from the BD recorder 400, to the TV 500 via the Miracast adapter 300 and reproduce the video and the like in the TV 500.

(3) When the Miracast Adapter is in the Sink Mode

A procedure of connection conforming to the Miracast performed between a source device and a sink device when the Miracast adapter 300 is in the sink mode, that is, when the Miracast adapter 300 is the sink device on a video reception side and the HMD 100 is the source device on a video transmission side is explained. Note that a procedure of the Miracast connection between the Miracast adapter 300 functioning as the sink device and the HMD 100 compliant with the Miracast is the same as the procedure of the Miracast connection between the adapter functioning as the sink device compliant with the Miracast in the past and the source device compliant with the Miracast in the past. Therefore, in the following explanation, an overview of the procedure of the Miracast connection between the Miracast adapter 300 functioning as the sink device and the HMD 100 compliant with the Miracast is explained.

The user selects the sink mode MRx using the Miracast changeover switch 305 (see FIGS. 1 and 4), whereby the Miracast adapter 300 starts the operation of the sink device. On the other hand, the user selects and executes the icon for Miracast execution (FIG. 3), sets the mode changeover switch MS of the menu screen (see FIG. 6) of the Miracast connection to the source mode (Source) side, and taps the start button ST, whereby the HMD 100 starts the operation of the source device.

The source device and the sink device perform detection of a device and detection of a service each other according to the procedure of the Miracast connection. In the HMD 10, which is the source device, as in the case of the sink mode, a result of the sink device detection is displayed in the display field of the connectable sink devices of the display screen SD (see FIGS. 7A and 7B). The user taps a device name of the Miracast adapter 300 functioning as a connection target sink device out of the connectable sink devices, whereby the Miracast adapter 300 is selected as the connection target sink device, setting of the Miracast connection is started from the source device to the sink device, and the Miracast connection is established. As a result, it is possible to perform radio transmission of a video and sound according to the Miracast from the HMD 100, which is the source device, to the Miracast adapter 300, which is the sink device. It is possible to perform display of the video and output of the sound in the TV 500 via the Miracast adapter 300. Note that, when a video and the like are transmitted from the HMD 100 to the TV 500 via the Miracast adapter 300, in the HMD 100, the video and the like may be transmitted without being reproduced (also called "streaming"). The video and the like may be transmitted to the TV 500 as well via the Miracast adapter 300 and reproduced in the TV 500 while being reproduced in the HMD 100 (also called "mirroring").

A5. Effects

In the first embodiment explained above, the Miracast adapter 300 does not include a display section (e.g., a display including a liquid crystal or an organic EL device) and an operation unit (e.g., a touch panel employing various systems) for realizing an advanced user interface usually included in the source device in the past. Therefore, when the Miracast adapter 300 is the source device on the video transmission side and the HMD 100 is the sink device on the video reception side, unlike in the past, the user cannot select the sink device on the source device side and attain establishment of the Miracast connection. However, as explained above, the device name of the sink device transmitted from the sink device to the source device during the processing for establishment of the connection of the P2P (the second connection) by the Wi-Fi Direct between the source device and the sink device is collated with the connectable device list DL registered in advance after the establishment of the connection of the P2P by the Wi-Fi Direct, whereby the source device can specify a connection target sink device. Consequently, the source device can continuously execute a procedure for selecting the specified sink device and attaining establishment of the Miracast connection (the first connection) and attain the establishment of the Miracast connection. That is, it is possible to attain the establishment of the Miracast connection without changing a procedure performed between the source device and the sink device from the procedure performed when a sink device is selected and establishment of the Miracast is attained on the source device side. Consequently, it is possible to solve the problem in that, since the source device equipped with neither the display unit nor the operation unit for realizing the advanced UI like the Miracast adapter 300 cannot select a sink device that should be connected to the source device, the connection conforming to the procedure of the Miracast (the video radio communication standard) between the source device and the sink device cannot be performed.

B. Second Embodiment

In explanation in a second embodiment of the invention, a new procedure different from the procedure for establishment of the Miracast connection illustrated in the first embodiment is provided to select a connection target sink device in a source device. Note that a video display system in this embodiment is the same as the video display system 1000 in the first embodiment. Illustration and explanation of the video display system are omitted.

FIG. 12 is an explanatory diagram showing a procedure of connection conforming to the Miracast performed between the Miracast adapter 300 and the HMD 100 when the Miracast adapter 300 is in the source mode. The procedure shown in FIG. 12 is different from the procedure of connection in the first embodiment shown in FIG. 5 in that steps S101 and S103 in the sink device are added and in that step S313 is added and steps S314 and S316 are changed to steps S314*b* and S316*b* in the source device.

In the HMD 100 functioning as the sink device, the user selects the icon for Miracast execution (see FIG. 3) and executes an application for the Miracast connection, whereby the Miracast control unit 195 starts an operation. First, the Miracast control unit 195 executes an operation for acquiring peculiar information of the source device (step S101). Specifically, for example, the acquisition operation can be executed by causing the camera 67 (see FIGS. 1 and 2) and the camera control unit 175 to operate as the peculiar information acquisition device and reading peculiar information included in a QR code or a barcode (hereinafter referred to as "QR code or the like") attached to a housing surface of the Miracast adapter 300. Note that, as the peculiar information, for example, various data determined in advance as information indicating connection permission can be used. Note that the acquired peculiar information may be displayed over the Miracast adapter 300 included in the outside scene SC (see FIG. 3) see-through displayed in the visual field VR of the HMD 100. This display can be executed by various kinds of image recognition and the like for, for example, continuing the operation of a peculiar-information acquiring unit and recognizing a device that provides the acquired peculiar information.

In the Miracast adapter 300 functioning as the source device and the HMD 100 functioning as the sink device, a procedure same as the procedure in the first embodiment is executed (steps S302 to S312 and steps S102 to S112). The connection of the P2P by the Wi-Fi Direct is established between the source device and the sink device.

When the connection of the P2P by the Wi-Fi Direct is established, the source device requests the sink device to transmit the peculiar information acquired by the sink device (step S313). In this case, as a response to the request of the source device, the sink device transmits the peculiar information acquired in step S101 to the source device (step S113). The source device receives the peculiar information acquired by the sink device. Note that the acquisition request and the response can be executed by using a procedure (a protocol) provided anew in the established connection of the P2P by the Wi-Fi Direct.

The source device, which receives the peculiar information transmitted from the sink device, collates peculiar information of the source device stored in the Miracast setting information 322 in advance (information same as the peculiar information included in the QR code or the like) and the received peculiar information (step S314b). When the kinds of peculiar information do not coincide with each other (No in step S316b), the source device determines that a sink device connectable by the Miracast connection is absent and ends the processing of the Miracast connection. On the other hand, when the kinds of peculiar information coincide with each other (Yes in step S316b), the source device determines that the sink device, which transmits the peculiar information, is a sink device connectable by the Miracast connection and selects the sink device as a connection target device. The source device continues the setting of the Miracast connection between the source device and the sink device (step S318). According to the continuation of the setting, the sink device also continues the setting of the Miracast connection between the sink device and the source device (step S118). As a result, the source device and the sink device establish the Miracast connection (steps S320 and S120). It is possible to execute radio transmission of a video from the source device to the sink device (steps S322 and S122).

In the second embodiment explained above, as explained above, the sink device acquires in advance, as the peculiar information, the information indicating connection permission provided by the source device. The source device can specify and select the connection target sink device by collating, after the establishment of the connection of the P2P by the Wi-Fi Direct between the source device and the sink device, the peculiar information transmitted from the sink device as the response to the request to the sink device according to the procedure provided anew with the peculiar information provided by the source device. Consequently, the source device can continuously execute a procedure in attaining establishment of the connection in the Miracast between the source device and the selected sink device and attain the establishment of the connection in the Miracast. Therefore, in this embodiment, after the establishment of the connection of the P2P by the Wi-Fi Direct, a new procedure for transmitting and receiving the peculiar information, which the sink device acquires from the source device, between the source device and the sink device is necessary. However, it is possible to select a connection target sink device in the source device and attain the establishment of the Miracast connection. Consequently, it is possible to solve the problem in that, since the source device equipped with neither the display unit nor the operation unit for realizing the UI like the Miracast adapter 300 cannot select a sink device that should be connected to the source device, the connection conforming to the procedure of the Miracast between the source device and the sink device cannot be performed.

Note that the peculiar information provided by the Miracast adapter 300 is the peculiar information provided by the video transmission device according to the aspect of the invention and is equivalent to connection identification information indicating that the Miracast adapter 300 is a connection target conforming to the video radio transmission standard.

C. Third Embodiment

In a third embodiment of the invention, a configuration in which a connection target sink device can be automatically determined in a source device is explained. In the following explanation, only portions having configurations and operations different from the configurations and the operations in the first embodiment are explained. Note that, in the figures, components same as the components in the first embodiment are denoted by reference numerals and signs same as the reference numerals and signs in the first embodiment. Detailed explanation of the components is omitted.

FIG. 13 is a block diagram functionally showing the configuration of the Miracast adapter 300 in the third embodiment. The Miracast adapter 300 in this embodiment is different from the Miracast adapter 300 in the first embodiment shown in FIG. 4 in that priority information 324 and determination method information 326 are stored instead of the Miracast setting information 322 in the storing unit 320. In the Miracast control unit 316 in the third embodiment, a procedure of connection conforming to the Miracast is different from the procedure in the first embodiment. Details of the connection procedure are explained below.

FIG. 14 is an explanatory diagram showing an example of the priority information 324. The priority information 324 is information used by the Miracast adapter 300, which operates as the source device, to determine a partner (a sink device) of connection conforming to the Miracast. In the priority information 324, concerning a plurality of devices included in the video display system 1000, information concerning the devices is stored. Specifically, the priority information 324 includes fields of a device identifier, a device name, a predetermined priority level, radio wave intensity, the number of times of connection, and a most recently connected device.

In the "device identifier", identifiers for uniquely identifying the devices included in the video display system 1000 are stored. As the identifiers, any forms such as a character string and alphanumeric characters can be used. In the "device name", names of devices represented by the device identifiers are stored.

In the "predetermined priority level", character strings (in the example shown in the figure, numbers) representing priority levels decided in advance are stored.

In the "radio wave intensity", character strings (in the example shown in the figure, numbers) representing the intensities of radio waves in radio communication between the devices included in the video display system 1000 and the Miracast adapter 300 are stored. The Miracast control unit 316 may periodically acquire the intensity of a radio wave received by an antenna of the Wi-Fi transmission and reception unit 360 and update the radio wave intensity. Note that the field of the radio wave intensity may be omitted. The radio wave intensity serves as "information concerning a radio wave".

In the "number of times of connection", integrated values of the numbers of times the Miracast connection was performed in the past between the devices included in the video display system 1000 and the Miracast adapter 300 are stored. The Miracast control unit 316 may increment the number of times of connection every time the connection conforming to the Miracast is carried out. The number of times of connection serves as "information in the past concerning connection".

In the "most recently connected device", character strings representing whether the devices included in the video display system 1000 are targets of the Miracast connection of the last time are stored. In the example shown in the figure, "Y" indicates that the devices are targets of the Miracast connection of the last time and "N" indicates that the devices are not targets of the Miracast connection of the last time. The Miracast control unit 316 may update the most recently connected device every time connection conforming to the Miracast is carried out. The most recently connected device serves as "information in the past concerning connection".

Note that the kinds of information in the priority information 324 may be configured to be changeable by the user of the video display system 1000. For example, values stored in the device name and values stored in the predetermined priority level may be changeable by the user of the video display system 1000. As means for the change, for example, the user may cause the image display unit 20 of the HMD 100 to display the priority information 324 to make it possible to edit the priority information 324 using the control unit 10 of the HMD 100. Alternatively, the user may cause the TV 500 to display the priority information 324 to make it possible to edit the priority information 324 using a not-shown remote controller of the TV 500.

FIG. 15 is an explanatory diagram showing an example of the determination method information 326. In the determination method information 326, a method used by the Miracast control unit 316 of the Miracast adapter 300, which operates as the source device, to determine, in processing of connection conforming to the Miracast in the third embodiment, a partner (a sink device) of the connection conforming to the Miracast is stored. In this embodiment, in the determination method information 326, any one of the "predetermined priority level", the "radio intensity", the "number of times of connection", the "most recently connected device", and "overall" is stored.

FIG. 16 is an explanatory diagram showing a procedure of connection conforming to the Miracast performed between the Miracast adapter 300 and the HMD 100 when the Miracast adapter 300 is in the source mode in the third embodiment. The procedure in this embodiment is different from the procedure in the first embodiment explained with reference to FIG. 5 in that, in the source device, the procedure includes steps S400 and S402, the procedure includes step S308a instead of step S308, and the procedure does not include steps S314 and S316. The procedure is different from the procedure in the first embodiment in that, in the sink device, the procedure does not include step S106 and the procedure includes step S108a instead of step S108.

The Miracast adapter 300 operating as the source device executes steps S400 and S402 to thereby determine a partner of the connection conforming to the Miracast, that is, a sink device out of the devices detected in step S304. Specifically, in step S400, the Miracast control unit 316 of the Miracast adapter 300 refers to a value stored in the determination method information 326 to specify a determination method for a sink device.

In step S402, the Miracast control unit 316 of the Miracast adapter 300 determines a sink device. Specifically, when the determination method for a sink device specified in step S400 is the "predetermined priority level", the Miracast control unit 316 refers to the "predetermined priority level" of the priority information 324 and extracts an entry (a row) in which a value indicating the highest priority level (e.g., when the priority level is determined in the ascending order of the character strings, "1" or "A") is stored. The Miracast control unit 316 determines that a device specified by the device identifier or the device name of the extracted entry is a sink device. In the example shown in FIG. 14, the Miracast control unit 316 determines that the HMD 100 is a sink device.

When the determination method for a sink device is the "radio wave intensity", the Miracast control unit 316 refers to the "radio wave intensity" of the priority information 324 and extracts an entry in which a value indicating the highest radio wave intensity is stored. The Miracast control unit 316 determines that a device specified by the device identifier or the device name of the extracted entry is a sink device. In the example shown in FIG. 14, the Miracast control unit 316 determines that the HMD 100 is a sink device. Note that, when the field of the radio wave intensity is omitted in the priority level information 324, the Miracast control unit 316 may acquire the intensity of a radio wave received by the antenna of the Wi-Fi transmission and reception unit 360 and determine that a device having the highest intensity is a sink device.

When the determination method for a sink device is the "number of times of connection", the Miracast control unit 316 refers to the "number of times of connection" of the priority information 324 and extracts an entry in which a value indicating the largest number of times of connection is stored. The Miracast control unit 316 determines that a device specified by the device identifier or the device name of the extracted entry is a sink device. In the example shown in FIG. 14, the Miracast control unit 316 determines that the HMD 100 is a sink device.

When the determination method for a sink device is the "most recently connected device", the Miracast control unit 316 refers to the "most recently connected device" of the priority information 324 and extracts an entry in which a value indicating that a device is a target of the Miracast connection of the last time, that is, "Y" is stored. The Miracast control unit 316 determines that a device specified by the device identifier or the device name of the extracted entry is a sink device. In the example shown in FIG. 14, the Miracast control unit 316 determines that the TV 500 is a sink device.

FIG. 17 is a diagram for explaining a method of determining a sink device when the determination method for a sink device is "overall". When the determination method for a sink device specified in step S400 in FIG. 16 is "overall", the Miracast control unit 316 calculates priority levels respectively derived when the predetermined priority level, the radio wave intensity, the number of times of connection, and the most recently connected device are adopted as the determination method for a sink device (FIG. 17). The Miracast control unit 316 totals, for each of the entries (in other words, for each of the devices), numbers respectively representing the calculated priority levels and calculates overall priority levels in the devices. In this embodiment, the Miracast control unit 316 determines priority levels in the ascending order of the character strings. Therefore, the Miracast control unit 316 determines that a device having the smallest value of the calculated overall priority level is a sink device. In an example shown in FIG. 17, the Miracast control unit 316 determines that the HMD 100 is a sink device. Note that the Miracast control unit 316 may use other statistical methods (e.g., an average or a mode) instead of the total value of the priority levels.

In step S108a of FIG. 16, the Miracast control unit 195 of the HMD 100 stays on standby until the start of setting of connection in the Miracast is performed from the source device.

On the other hand, the Miracast control unit 316 of the Miracast adapter 300 starts, taking the determination of the sink device (step S402) as an opportunity, setting of the Miracast connection (setup of connection) for the sink device determined in step S402 (step S308a). Details of the setting of the Miracast connection are the same as the details in the first embodiment. Note that an example shown in FIG. 16 is an example in which the HMD 100 is determined as a sink device in step S402. If another device (e.g., the TV 500) is determined as a sink device in step S402, the processing in step S108a and subsequent steps explained as being executed by the HMD 100 is executed in the determined other device.

Note that the opportunity for the Miracast control unit 316 of the Miracast adapter 300 to start the setting of the Miracast connection can be arbitrarily changed. For example, the Miracast control unit 316 may start the setting of the Miracast connection taking, as an opportunity, setting of the Miracast adapter 300 to sink mode ON, that is, selection of the sink mode MRx with the Miracast change-over switch 305. Turn-on of the power supply of the Miracast adapter 300 may be an opportunity.

In the third embodiment explained above, as explained above, the Miracast adapter 300 (the video transmission device) functioning as the source device can determine a sink device (a video reception and display device) set as a target of the Miracast connection. Therefore, it is possible to solve the problem in that, since the source device equipped with neither the display unit nor the operation unit for realizing the UI cannot select a sink device that should be connected to the source device, the connection conforming to the Miracast (the video radio communication standard) between the source device and the sink device cannot be performed.

Further, in the third embodiment, the Miracast adapter 300 (the video transmission device) functioning as the source device can determine a connection target using information stored in the source device (i.e., the priority level stored in the source device in advance), information that the source device can automatically acquire (i.e., information concerning a radio wave of the sink device (the video reception and display device) received by the source device and information in the past concerning connection). Therefore, the Miracast adapter 300 functioning as the source device does not need an input from the user of the video display system 1000 in determination of a connection target. As a result, it is possible to solve the problem in that, since the source device equipped with neither the display unit nor the operation unit for realizing the UI cannot select a sink device that should be connected to the source device, the connection conforming to the Miracast (the video radio communication standard) between the source device and the sink device cannot be performed.

As explained above, with the video display system 1000 according to the embodiments, the Miracast control unit 316 of the Miracast adapter 300 (the video transmission device or the source device) starts the processing of establishment of the second connection between the Miracast adapter 300 and the HMD 100 according to any one of the acquisition of a request from the HMD 100 (the video reception and display device or the sink device) and the occurrence of an opportunity in the Miracast adapter 300. The second connection is peer-to-peer connection performed prior to the establishment of the first connection conforming to the Miracast (the video radio transmission standard). As in the first and second embodiments, when the processing of establishment of the second connection is started according to the acquisition of the request from the HMD 100, the Miracast control unit 316 of the Miracast adapter 300 can set the HMD 100, which is a transmission source of the request, as a partner of the second and first connections, that is, a partner of the Miracast connection. As in the third embodiment, when the processing of establishment of the second connection is started according to occurrence of an opportunity in the Miracast adapter 300 (that is, determination of a sink device), the Miracast control unit 316 of the Miracast adapter 300 can set, for example, a sink device determined by any method in the Miracast adapter 300 as a partner of the second and first connections, that is, a partner of the Miracast connection. As a result, with the video display system 1000 according to the embodiments, even the Miracast adapter 300 (the video transmission device or the source device) equipped with neither the display unit nor the operation unit for realizing the UI can specify a partner of the Miracast communication. Therefore, it is possible to enable connection conforming to the Miracast between the Miracast adapter 300 and the sink device.

D. Modifications

D1. Modification 1

In the first embodiment, the device name, which is the identification information peculiar to the HMD 100, is set as the connection permission identification information indicating that the HMD 100 is a connection permission target conforming to the Miracast. The Miracast adapter 300 functioning as the source device collates the device name transmitted from the HMD 100 functioning as the sink device during processing for establishment of connection of the P2P by the Wi-Fi Direct with the connectable device list DL to thereby determine whether the HMD 100 is connectable. However, the determination concerning whether the sink device is connectable is not limited to this. The Miracast adapter 300 may use, as the connection permission identification information, other peculiar identification information transmitted from the sink device during the processing of the establishment of connection of the P2P by the WiFi Direct and determine whether the sink device is connectable according to whether the identification information matches identification information registered in the source device in advance. For example, the Miracast adapter 300 can use a MAC address as the identification information peculiar to the HMD 100 and determine whether the HMD 100 is connectable according to whether the MAC address passes a filter by a MAC address registered in advance as identification information of connectable sink devices, that is, whether the MAC address matches the MAC address registered in advance.

D2. Modification 2

In the example explained in the second embodiment, the HMD 100 functioning as the sink device acquires the peculiar information, which indicates connection permission provided by the Miracast adapter 300 functioning as the source device, by reading the QR code or the like attached to the housing surface of the Miracast adapter 300. However, the acquisition of the peculiar information is not limited to this. For example, the HMD 100 may read, with the camera 67, as the peculiar information indicating connection permission, a specific display pattern attached to the housing surface of the Miracast adapter 300, for example, Miracast approval indication, a logo of the device, or a manufacturing number of the device. It is also possible that the Miracast adapter 300 causes the lighting unit 307 to emit light of a predetermined light emission pattern corresponding to the peculiar information indicating connection permission and the HMD 100 reads the specific light emission pattern. It is also possible that an infrared-ray emitting unit is provided in the Miracast adapter 300, the Miracast adapter 300 causes the infrared-ray emitting unit to emit light of a specific light emission pattern corresponding to the peculiar information indicating connection permission according to, for example, IrDA (Infrared Data Association), and the HMD 100 reads the light emission pattern. It is also possible that an RFID (Radio Frequency Identification) tag or an iBeacon is provided in the Miracast adapter 300 and the HMD 100 reads the peculiar information indicating connection permission included in the RFID tag or the iBeacon. It is also possible that a speaker is provided in the Miracast adapter 300 and the microphone of the HMD 100 collects and reads the peculiar information emitted by the speaker. That is, various kinds of peculiar information indicating connection permission provided by the Miracast adapter 300 functioning as the source device only has to be acquired by the HMD 100 functioning as the sink device. In the example explained in the second embodiment, the camera is used as the peculiar information acquisition device. However, the peculiar information acquisition device is not limited to the camera and can be arbitrarily changed according to an information transmission and reception method. For example, as the peculiar information acquisition device, a light receiving device for infrared light or the like, a communication device capable of performing radio communication or short range radio communication, and a microphone can be adopted.

D3. Modification 3

In the explanation in the second embodiment, after the application for the Miracast connection is executed, the acquisition operation for the peculiar information of the source device is executed (step S101 in FIG. 12). However, it is also possible that, first, an application for acquiring the peculiar information of the source device, in the second embodiment, an application for reading the QR code is actuated and the an application for the Miracast connection is executed with the acquisition of the peculiar information of the source device as a trigger (an opportunity). According to the modification 3, the Miracast adapter 300 functioning as the source device can request a sink device to transmit peculiar information and, when the peculiar information transmitted from the sink device matches information stored in the source device, select the sink device as a connection target sink device conforming to the Miracast (the video radio transmission standard) and execute the processing of the first connection conforming to the Miracast between the Miracast adapter 300 and the sink device. Therefore, it is possible to solve the problem in that, since the source device equipped with neither the display unit nor the operation unit for realizing the UI cannot select a sink device that should be connected to the source device, the connection conforming to the Miracast between the source device and the sink device cannot be performed.

D4. Modification 4

In the first embodiment, as in the second embodiment, an acquisition operation for the peculiar information of the source device may be added. In this case, the peculiar information only has to be a device name or a MAC address of the source device. In this case, in the sink device, the user does not need to select a target source device (step S106). The user can automatically select the target source device on the basis of the acquired peculiar information. As in the modification 3, the source device may execute an application for the Miracast connection with the acquisition of the peculiar information of the source device as a trigger.

D5. Modification 5

In the third embodiment, the example of the method in which the Miracast adapter 300 functioning as the source device determines a sink device (a partner of the connection conforming to the Miracast) is explained. However, the source device may determine a sink device using a method other than the method explained in the embodiment. For example, the Miracast adapter 300 may determine a sink device using various kinds of information concerning a radio wave other than the "radio wave intensity" illustrated in the third embodiment. As the information concerning a radio wave, for example, a frequency band used in radio communication between the source device and the sink device and presence or absence of encryption of communication content in the radio communication between the source device and the sink device may be used. For example, the Miracast adapter 300 may determine a sink device using various kinds of information in the past concerning connection other than the "number of times of connection" and the "most recently connected device" illustrated in the third embodiment. As the information in the past concerning connection, for example, a total value of time in which the Miracast connection was maintained (connection was maintained) in the past between the source device and the sink device may be used. The Miracast adapter 300 may determine a sink device using a combination of two or more of the priority level decided in advance, the information concerning a radio wave, and the information in the past concerning connection.

D6. Modification 6

In the embodiments, the HMD 100 is explained using, as the example, the structure of the separated type in which the control unit 10 and the image display unit 20 are connected via the connecting unit 40. However, the structure of the HMD 100 is not limited to this and can be variously modified. For example, the structure of the HMD 100 may be a structure of an integrated type in which the control unit 10 is entirely included in the image display unit 20 or may be a structure in which a part of the control unit 10 is included in the image display unit 20. The structure of the HMD 100 may be a structure in which the power supply 130 included in the control unit 10 is independently formed and replaceable. Components formed in the control unit may be redundantly formed in the image display unit. For example, CPUs may be formed in both of the control unit and the image display unit. Functions respectively performed by the CPU of the control unit and the CPU of the image display unit may be distinguished. A form may be adopted in which the control unit is incorporated in a personal computer (PC) and the image display unit is used instead of a monitor of the PC. A form of a wearable computer may be adopted in which the control unit and the image display unit are integrated and attached to clothes of a user.

D7. Modification 7

In the embodiments, the configuration is explained in which the Miracast adapter 300 is connected to the video apparatus 400 and the display device 500 noncompliant with the Miracast via the HDMI cable. However, the configuration of the Miracast adapter 300 is not limited to this. The Miracast adapter 300 may be an adaptor of a plug-in type structure inserted into the HDMI input and output terminals of the video apparatus, the display device, and the like noncompliant with the Miracast.

D8. Modification 8

In the embodiments, the HMD 100 compliant with the Miracast and the Miracast adapter 300 are explained as the example. However, the invention is not limited to this and can be applied to, instead of the HMD, various devices compliant with the Miracast and capable of functioning as a sink device such as a projector, a smartphone, a personal computer (PC), a table terminal, and portable electronic devices (a media player, a cellular phone, and the like).

D9. Modification 9

In the embodiments, the Miracast, which is one of the video radio transmission standards drawn up by the Wi-Fi Alliance is explained as the example. However, the invention is not limited to this and can be applied to various video radio transmission standards for transmitting a video and the like through one-to-one direct radio communication.

The invention is not limited to the embodiments and the modifications explained above and can be realized in various configurations without departing from the spirit of the invention. For example, the technical features in the embodiments and the modifications corresponding to the technical features in the aspects described in the summary can be replaced or combined as appropriate in order to solve a part or all of the problems or attain a part or all of the effects. The technical features can be deleted as appropriate unless the technical features are explained in this specification as essential technical features.

REFERENCE SIGNS LIST

10 Control unit
12 Lighting unit
14 Touch pad
16 Cross key
18 Power switch
20 Image display unit
21 Right holding unit
22 Right display driving unit
23 Left holding unit
24 Left display driving unit
26 Right optical-image display unit
28 Left optical-image display unit
30 Earphone plug
32 Right earphone
34 Left earphone
40 Connecting unit
42 Right cord
44 Left cord
46 Coupling member
48 Main body cord
51 Transmitting unit
52 Transmitting unit
53 Receiving unit
67 Camera
100 Head-mounted display device (video reception and display device, head mounted display, HMD)
110 Input-information acquiring unit (operation acquiring unit)
120 Storing unit
130 Power supply
132 Radio communication unit
140 CPU
160 Image processing unit
170 Sound processing unit
175 Camera control unit
180 Interface
190 Display control unit
195 Miracast control unit (reception side connection control unit)
201 Right backlight control unit (display driving unit)
202 Left backlight control unit (display driving unit)
221 Right backlight (display driving unit)
222 Left backlight (display driving unit)
251 Right projection optical system (display driving unit)
252 Left projection optical system (display driving unit)
261 Right light guide plate
262 Left light guide plate
300 Miracast adapter (video transmission device)
301 Power button
303 Pass-through button
305 Miracast changeover switch
307 Lighting unit
307A, 307B LEDs
310 CPU
311 OS
312 USB control unit
313 HDMI control unit
314 Wi-Fi control unit
315 Pass-through control unit
316 Miracast control unit (connection control unit)
320 Storing unit
322 Miracast setting information
324 Priority information
326 Determination method information
330 Power supply
332 AC adapter
340 USB interface
350 HDMI transmission and reception unit
360 Wi-Fi transmission and reception unit
400 Video apparatus (BD recorder)
500 Display device (TV)
600 Computer
1000 Video display system
DL Connectable device list
PCLK Clock signal
Data Image data
VSync Vertical synchronization signal
HSync Horizontal synchronization signal
Data1 Image data for right eye
Data2 Image data for left eye
EA End icon
OA External device
SC Outside scene
SD Display screen
RE Right eye
LE Left eye
VI Virtual image
CP Confirmation screen
SP Video reproduction screen
VR Visual field
ST Start button
MV Menu screen

The invention claimed is:

1. A video display system that transmits a video from a video transmission device to a video reception and display device according to a video radio transmission standard for transmitting a video through one-to-one direct radio communication and performs display, comprising:
  a connection control unit within the video transmission device, the video transmission device being equipped with neither a display unit nor an operation unit for realizing a user interface, the connection control unit being configured to control establishment of connection between the video transmission device and the video reception and display device, by:
    controlling establishment of a first connection for connecting the video transmission device and the video reception and display device according to the video radio transmission standard; and
    controlling establishment of a second connection for connecting the video transmission device and the video reception and display device peer-to-peer prior to the establishment of the first connection, by:

starting processing of establishment of the second connection according to any one of acquisition of a request from the video reception and display device and occurrence of an opportunity in the video transmission device; and when establishing the second connection, receiving connection identification information, transmitted from the video reception and display device, indicating that the video reception and display device is a connection target conforming to the video radio transmission standard.

2. The video display system according to claim 1, wherein the connection control unit of the video transmission device starts the processing of establishment of the second connection according to the acquisition of the request from the video reception and display device, and the connection control unit of the video transmission device establishes the first connection if the connection identification information matches connection identification information stored in the video transmission device.

3. The video display system according to claim 1, wherein the connection identification information is identification information peculiar to the video reception and display device transmitted from the video reception and display device to the video transmission device in the processing of establishment of the second connection.

4. The video display system according to claim 1, wherein the connection identification information is peculiar information provided by the video transmission device, the video reception and display device includes a peculiar information acquisition device for acquiring the peculiar information, and the video reception and display device acquires the peculiar information with the peculiar information acquisition device before a start of the processing of establishment of the second connection and transmits the acquired peculiar information to the video transmission device as the connection identification information after the establishment of the second connection.

5. The video display system according to claim 4, wherein the acquisition of the peculiar information is executed according to any one of the peculiar information acquisition device reading information concerning a QR code provided in the video transmission device, the peculiar information acquisition device reading information concerning a specific display pattern provided in the video transmission device, the peculiar information acquisition device reading information concerning an RF tag provided in the video transmission device, and the peculiar information acquisition device reading information represented by a specific light emission pattern of light emission of a light emitting unit provided in the video transmission device.

6. The video display system according to claim 4, wherein the video reception and display device is a head-mounted display device, and when the video transmission device is see-through displayed on the head-mounted display device, the peculiar information is displayed over the video transmission device.

7. The video display system according to claim 1, wherein the video reception and display device includes a peculiar information acquisition device for acquiring the peculiar information provided by the video transmission device, and the connection control unit of the video transmission device requests the video reception and display device to transmit the peculiar information, starts the processing of establishment of the second connection taking, as the opportunity, reception of the peculiar information transmitted from the video reception and display device, and establishes the first connection when the peculiar information transmitted from the video reception and display device matches information stored in the video transmission device.

8. The video display system according to claim 7, wherein the acquisition of the peculiar information is executed according to any one of the peculiar information acquisition device reading information concerning a QR code provided in the video transmission device, the peculiar information acquisition device reading information concerning a specific display pattern provided in the video transmission device, the peculiar information acquisition device reading information concerning an RF tag provided in the video transmission device, and the peculiar information acquisition device reading information represented by a specific light emission pattern of light emission of a light emitting unit provided in the video transmission device.

9. The video display system according to claim 7, wherein the video reception and display device is a head-mounted display device, and when the video transmission device is see-through displayed on the head-mounted display device, the peculiar information is displayed over the video transmission device.

10. The video display system according to claim 1, wherein the connection control unit of the video transmission device determines the video reception and display device to be a target of the connection, establishes the second connection between the video transmission device and the determined video reception and display device taking the determination of the target of the connection as the opportunity, and, after the establishment of the second connection, establishes the first connection between the video transmission device and the determined video reception and display device.

11. The video display system according to claim 10, wherein the determination of a target of the connection is executed based on any one of a priority level stored in the video transmission device in advance, information concerning a radio wave of the video reception and display device received by the video transmission device, past information concerning the connection, and a combination of two or more of the priority level, the information concerning the radio wave, and the past information.

12. A connection method conforming to a video radio transmission standard between a video transmission device and a video reception and display device in a video display system that transmits a video from the video transmission device to the video reception and display device according to the video radio transmission standard for transmitting a video through one-to-one direct radio communication and performs display, the connection method comprising:

(a) connecting, by a connection control unit within the video transmission device, the video transmission device and the video reception and display device according to the video radio transmission standard and establishing a first connection, the video transmission device being equipped with neither a display unit nor an operation unit for realizing a user interface;

(b) connecting, by the video transmission device, the video transmission device and the video reception and display device peer-to-peer prior to the establishment of the first connection and establishing a second connection; and (c) when establishing the second connection, receiving connection identification information by the video transmission device, the connection identification information having been transmitted from the video reception and display device and indicating that the video reception and display device is a connection target conforming to the video radio transmission standard, wherein step (b) is started according to any one of acquisition of a request from the video reception and display device and occurrence of an opportunity in the video transmission device.

13. A video transmission device comprising:

a connection control unit configured to control establishment of connection between the video transmission device and a video reception and display device, by:
controlling establishment of a first connection for connecting the video transmission device and the video reception and display device according to a video radio transmission standard for transmitting a video through one-to-one direct radio communication;
controlling establishment of a second connection for connecting the video transmission device and the video reception and display device peer-to-peer prior to the establishment of the first connection, by:
starting processing of establishment of the second connection according to any one of acquisition of a request from the video reception and display device and occurrence of an opportunity in the video transmission device; and
when establishing the second connection, receiving connection identification information, transmitted from the video reception and display device, indicating that the video reception and display device is a connection target conforming to the video radio transmission standard, wherein the video transmission device is equipped with neither a display unit nor an operation unit for realizing a user interface.

14. The video transmission device according to claim 13, wherein the connection control unit starts the processing of establishment of the second connection according to the acquisition of the request from the video reception and display device and, when establishing the second connection, if the connection identification information matches connection identification information stored in the video transmission device, establishes the first connection.

15. A video reception and display device comprising:
a peculiar information acquisition device for acquiring peculiar information provided by a video transmission device; and
a reception-side connection control unit configured to control establishment of connection between the video transmission device and the video reception and display device, by:
controlling establishment of a first connection for connecting the video transmission device and the video reception and display device according to a video radio transmission standard for transmitting a video through one-to-one direct radio communication; and
controlling establishment of a second connection for connecting the video transmission device and the video reception and display device peer-to-peer prior to the establishment of the first connection, by:
acquiring the peculiar information with the peculiar information acquisition device before a start of processing of establishment of the second connection; and
transmitting, after the establishment of the second connection, the acquired peculiar information to the video transmission device as connection identification information indicating that the video reception and display device is a connection target conforming to the video radio transmission standard, wherein the video transmission device is equipped with neither a display unit nor an operation unit for realizing a user interface, and the reception-side control unit.

16. A video display system that transmits a video from a video transmission device to a video reception and display device according to a video radio transmission standard for transmitting a video through one-to-one direct radio communication and performs display, comprising:
a connection control unit within the video transmission device, the video transmission device being equipped with neither a display unit nor an operation unit for realizing a user interface, the connection control unit being configured to control establishment of connection between the video transmission device and the video reception and display device, by:
controlling establishment of a first connection for connecting the video transmission device and the video reception and display device according to the video radio transmission standard, the video transmission device not recognizing the video reception and display device according to the first connection; and
controlling establishment of a second connection for connecting the video transmission device and the video reception and display device peer-to-peer prior to the establishment of the first connection, information enabling the video transmission device to recognize the video reception and display device being sent via the second connection, the connection control unit starting processing of establishment of the second connection according to any one of acquisition of a request from the video reception and display device and occurrence of an opportunity in the video transmission device.

* * * * *